(12) United States Patent
Foote

(10) Patent No.: US 7,710,463 B2
(45) Date of Patent: May 4, 2010

(54) METHOD AND SYSTEM FOR COMPENSATING FOR PARALLAX IN MULTIPLE CAMERA SYSTEMS

(75) Inventor: Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1103 days.

(21) Appl. No.: 11/345,708

(22) Filed: Feb. 2, 2006

(65) Prior Publication Data

US 2006/0125921 A1   Jun. 15, 2006

Related U.S. Application Data

(60) Division of application No. 09/989,638, filed on Nov. 20, 2001, now Pat. No. 7,277,118, which is a continuation-in-part of application No. 09/370,406, filed on Aug. 9, 1999, now Pat. No. 7,015,954.

(51) Int. Cl.
 H04N 5/225 (2006.01)
 H04N 7/00 (2006.01)
 H04N 13/02 (2006.01)
(52) U.S. Cl. .................. 348/218.1; 348/36; 348/48
(58) Field of Classification Search .............. 348/218.1, 348/47, 48
See application file for complete search history.

(56) References Cited

U.S. PATENT DOCUMENTS

| | | | |
|---|---|---|---|
| 4,393,394 A | 7/1983 | McCoy | |
| 4,395,093 A | 7/1983 | Rosendahl et al. | |
| 4,484,801 A | 11/1984 | Cox | |
| 4,558,462 A | 12/1985 | Horiba et al. | |
| 4,583,117 A | 4/1986 | Lipton et al. | |
| 4,707,735 A | 11/1987 | Busby | |
| 4,745,479 A | 5/1988 | Waehner | |
| 4,772,942 A | 9/1988 | Tuck | |
| 4,819,064 A | 4/1989 | Diner | |
| 4,862,388 A | 8/1989 | Bunker | |
| 4,868,682 A | 9/1989 | Shimizu et al. | |
| 4,947,260 A | 8/1990 | Reed et al. | |
| 4,974,073 A | 11/1990 | Inova | |
| 4,985,762 A | 1/1991 | Smith | |
| 5,023,720 A | 6/1991 | Jardins | |
| 5,023,725 A | 6/1991 | McCutchen | |
| 5,040,055 A | 8/1991 | Smith | |
| 5,068,650 A | 11/1991 | Fernandez et al. | |
| 5,083,389 A | 1/1992 | Alperin | |

(Continued)

OTHER PUBLICATIONS

Bennett, Frazer, et al., "Chapter 1: Developments in Networked Multimedia," Proc. NEC Research Symposium in Multimedia Computing, ftp://ftp.orl.co.uk/pub/docs/orl/tr.95.6.ps.Z, pp. 1-12 (May 1995).

(Continued)

Primary Examiner—Luong T Nguyen
(74) Attorney, Agent, or Firm—Fliesler Meyer LLP

(57) ABSTRACT

A camera array captures plural component images which are combined into a single scene. In one embodiment, each camera of the array is a fixed digital camera. The images from each camera are warped to a common coordinate system and the disparity between overlapping images is reduced using disparity estimation techniques.

11 Claims, 28 Drawing Sheets

U.S. PATENT DOCUMENTS

| | | |
|---|---|---|
| 5,115,266 A | 5/1992 | Troje |
| 5,130,794 A | 7/1992 | Ritchey |
| 5,140,647 A | 8/1992 | Ise et al. |
| 5,142,357 A | 8/1992 | Lipton et al. |
| 5,153,716 A | 10/1992 | Smith |
| 5,170,182 A | 12/1992 | Olson et al. |
| 5,175,616 A | 12/1992 | Milgram et al. |
| 5,185,667 A | 2/1993 | Zimmermann |
| 5,187,571 A | 2/1993 | Braun et al. |
| 5,231,673 A | 7/1993 | Elenga |
| 5,258,837 A | 11/1993 | Gormley |
| 5,287,093 A | 2/1994 | Amano et al. |
| 5,291,334 A | 3/1994 | Wirth et al. |
| 5,302,964 A | 4/1994 | Lewins |
| 5,369,450 A | 11/1994 | Haseltine et al. |
| 5,424,773 A | 6/1995 | Saito |
| 5,444,478 A | 8/1995 | Lelong et al. |
| 5,465,128 A | 11/1995 | Wah Lo et al. |
| 5,465,163 A | 11/1995 | Yoshihara et al. |
| 5,469,274 A | 11/1995 | Iwasaki |
| 5,499,110 A | 3/1996 | Hosogai |
| 5,502,309 A | 3/1996 | Davis |
| 5,508,734 A | 4/1996 | Baker et al. |
| 5,510,830 A | 4/1996 | Ohia et al. |
| 5,539,483 A | 7/1996 | Nalwa |
| 5,548,409 A | 8/1996 | Ohta et al. |
| 5,563,650 A | 10/1996 | Poelstra |
| 5,602,584 A | 2/1997 | Mitsutake et al. |
| 5,608,543 A | 3/1997 | Tamagaki et al. |
| 5,611,033 A | 3/1997 | Pitteloud et al. |
| 5,619,255 A | 4/1997 | Booth |
| 5,625,462 A | 4/1997 | Ohta et al. |
| 5,646,679 A | 7/1997 | Yano et al. |
| 5,649,032 A | 7/1997 | Burt et al. |
| 5,650,814 A | 7/1997 | Florent et al. |
| 5,657,073 A | 8/1997 | Henley |
| 5,657,402 A | 8/1997 | Bender et al. |
| 5,666,459 A | 9/1997 | Ohta et al. |
| 5,668,595 A | 9/1997 | Katayama et al. |
| 5,680,150 A | 10/1997 | Shimizu et al. |
| 5,682,198 A | 10/1997 | Katayama et al. |
| 5,689,611 A | 11/1997 | Ohta et al. |
| 5,691,765 A | 11/1997 | Schieltz et al. |
| 5,699,108 A | 12/1997 | Katayama et al. |
| 5,703,604 A | 12/1997 | McCutchen |
| 5,721,585 A | 2/1998 | Keast et al. |
| 5,745,305 A | 4/1998 | Nalwa |
| 5,760,826 A | 6/1998 | Nayar |
| 5,768,443 A | 6/1998 | Michael et al. |
| 5,790,181 A | 8/1998 | Chahl et al. |
| 5,793,527 A | 8/1998 | Nalwa |
| 5,812,704 A | 9/1998 | Pearson et al. |
| 5,838,837 A | 11/1998 | Hirosawa et al. |
| 5,841,589 A | 11/1998 | Davis et al. |
| 5,848,197 A | 12/1998 | Ebihara |
| 5,870,135 A | 2/1999 | Glatt et al. |
| 5,903,303 A | 5/1999 | Fukushima et al. |
| 5,920,376 A | 7/1999 | Bruckstein et al. |
| 5,920,657 A | 7/1999 | Bender et al. |
| 5,940,641 A | 8/1999 | McIntyre et al. |
| 5,956,418 A | 9/1999 | Aiger et al. |
| 5,963,664 A | 10/1999 | Kumar et al. |
| 5,966,177 A | 10/1999 | Harding |
| 5,973,726 A | 10/1999 | Iijima et al. |
| 5,978,143 A | 11/1999 | Spruck |
| 5,982,452 A | 11/1999 | Gregson et al. |
| 5,982,941 A | 11/1999 | Loveridge et al. |
| 5,982,951 A | 11/1999 | Katayama et al. |
| 5,987,164 A | 11/1999 | Szeliski et al. |
| 5,990,934 A | 11/1999 | Nalwa |
| 5,990,941 A | 11/1999 | Jackson et al. |
| 6,002,430 A | 12/1999 | McCall et al. |
| 6,005,987 A * | 12/1999 | Nakamura et al. .......... 382/294 |
| 6,009,190 A | 12/1999 | Szeliski et al. |
| 6,011,558 A | 1/2000 | Hsieh et al. |
| 6,028,719 A | 2/2000 | Beckstead et al. |
| 6,040,852 A | 3/2000 | Stuettler |
| 6,043,837 A | 3/2000 | Driscoll, Jr. et al. |
| 6,044,181 A | 3/2000 | Szeliski |
| 6,064,760 A | 5/2000 | Brown |
| 6,078,701 A | 6/2000 | Hsu et al. |
| 6,097,430 A | 8/2000 | Komiya et al. |
| 6,097,854 A | 8/2000 | Szeliski et al. |
| 6,111,702 A | 8/2000 | Nalwa |
| 6,115,176 A | 9/2000 | Nalwa |
| 6,118,474 A | 9/2000 | Nayar |
| 6,128,143 A | 10/2000 | Nalwa |
| 6,128,416 A | 10/2000 | Oura |
| 6,141,145 A | 10/2000 | Nalwa |
| 6,144,501 A | 11/2000 | Nalwa |
| 6,148,118 A | 11/2000 | Murakami et al. |
| 6,173,087 B1 | 1/2001 | Kumar et al. |
| 6,175,454 B1 | 1/2001 | Hoogland et al. |
| 6,188,800 B1 | 2/2001 | Okitsu |
| 6,195,204 B1 | 2/2001 | Nalwa |
| 6,211,911 B1 | 4/2001 | Komiya et al. |
| 6,215,914 B1 | 4/2001 | Nakamura et al. |
| 6,219,090 B1 | 4/2001 | Nalwa |
| 6,259,470 B1 * | 7/2001 | Koizumi et al. ............ 348/14.1 |
| 6,285,365 B1 | 9/2001 | Nalwa |
| 6,285,370 B1 | 9/2001 | McDowall et al. |
| 6,349,153 B1 * | 2/2002 | Teo .......................... 382/294 |
| 6,452,628 B2 | 9/2002 | Kato et al. |
| 6,526,095 B1 | 2/2003 | Nakaya et al. |
| 6,545,702 B1 | 4/2003 | Konolige et al. |
| 6,782,139 B2 * | 8/2004 | Bender et al. ................. 348/36 |
| 2003/0035047 A1 | 2/2003 | Katayama et al. |

OTHER PUBLICATIONS

Chen, Shenchang, et al., "View Interpolation for Image Synthesis," Computer Graphics (*SIGGRAPH'93*), pp. 279-288 (Aug. 1993).

Chu, Peter L., "Superdirective Microphone Array for a Set-Top Videoconferencing System," Proc. ICASSP 97, 4 pages (1997).

De Silva, Liyanage, et al., "Use of Steerable Viewing Window (SVW) to Improve the Visual Sensation in Face to Face Teleconferencing," Proc. ICASSP-94, vol. 6, pp. 421-424 (May 1994).

Elko, Gary W., et al., "A Steerable and Variable First-Order Differential Microphone Array," Proc. ICASSP 97, 4 pages (1997).

FullView®, "Technology," http://www.fullview.com/technology_main.html, 5 pages, printed Oct. 2, 2001.

Huang, Qian, et al., "Content Based Active Video Data Acquisition Via Automated Cameramen," Proc. ICIP, IEEE, pp. 808-812 (Jan. 1998).

Immersive Media, "Dodeca™ 1000 Camera," http://www.immersivemedia.com/products/dodeca1000.html, 3 pages, printed Oct. 2, 2001.

Immersive Media, "Immersive Media Presents Telemmersion™ Immersive Video," http://www.immersivemedia.com/menu.html, 2 pages, printed Oct. 2, 2001.

Immersive Media, "Producing Immersive Video," http://www.immersivemedia.com/producing, 4 pages, printed Oct. 2, 2001.

Immersive Media, "Services, Hardware, and Software," http://www.immersivemedia.com/products.html, 3 pages, printed Oct. 2, 2001.

Internet Pictures Corporation, http://www.ipix.com/, 1 page, printed Oct. 2, 2001.

Internet Pictures Corporation, "Immersive Imaging," http://www.ipix.com/products/immersive.shtml, 1 page, printed Oct. 2, 2001.

Internet Pictures Corporation, "*Immersive Stills*," http://www.ipix.com/products/immersive_stills.shtml, 2 pages, printed Oct. 2, 2001.

Internet Pictures Corporation, "iPIX® Software," http://www.ipix.com/products/software/software.shtml, 3 pages, printed Oct. 2, 2001.

IPIX, the Internet Pictures Corporation, www.ipix.com/aboutus/about_content.html, 1 page.

Majumder, Aditi, et al., "Immersive Teleconferencing: A New Algorithm to Generate Seamless Panoramic Video Imagery," Proc. ACM Multimedia, ACM, pp. 169-176 (Oct. 1999).

Mann, S., et al., "Video Orbits of the Projective Group: A New Perspective on Image Mosaicing," MIT Media Laboratory Perceptual Computing Section Technical Report 338, 17 pages.

Mann, Steve, "Compositing Multiple Pictures of the Same Scene," Proc. $46^{th}$ Annual Imaging Science and Technology Conference, Cambridge, Massachusetts, 4 pages (May 1993).

Omnidirectional Vision, http://www.cis.upenn.edu/~kostas/omni.html, 4 pages, printed Oct. 2, 2001.

"OmniSight™ Solutions for Natural Meetings™:Technical Specifications for Typical System," 1 page.

Shum, Heung-Yeung, et al., "Panoramic Image Mosaics," Technical Report MSR-TR-97-23, Microsoft Research, www.research.microsoft.com/scripts/pubdb/trpub.asp, 53 pages (Sep. 1997).

Smith, Brian C., et al., "Compressed Domain Processing of JPEG-Encoded Images," Real-Time Imaging Journal, http://www.cs.cornell.edu/zeno/Papers/cdp/cdp_rtij96.pdf, 37 pages.

Sony, "Operating Instructions," Sony EVI-D30 Color Video Camera, 53 pages.

Swaminathan, Rahul, et al., "Non-Metric Calibration of Wide-Angle Lenses and Polycameras," Proc. CVPR, IEEE, pp. 413-419 (1999).

Taniguchi, Yukinobu, et al., "PanoramaExcerpts: Extracting and Packing Panoramas for Video Browsing," Proc. ACM Multimedia 97, Seattle, WA, pp. 427-436 (1997).

Teodosio, Laura, et al., "Salient Video Stills: Content and Context Preserved," Proc. ACM Multimedia 93, Anaheim, CA, pp. 39-46 (1993).

Wang, Ce, et al., "A Hybrid Real-Time Face Tracking System," Proc. ICASSP '98, 4 pages (1998).

Wolberg, George, "Digital Image Warping," IEEE Computer Society Press, Los Alamitos, CA, pp. 41-61 (1990).

Wren, Christopher, et al. "Pfinder: Real-Time Tracking of the Human Body," IEEE Transactions on Pattern Analysis and Machine Intelligence, IEEE, vol. 19, No. 7, pp. 780-785 (Jul. 1997).

Yokoya, Naokazu, et al., "Passive Range Sensing Techniques: Depth from Images," IEICE Trans. Inf. & Syst., vol. E82-D, No. 3, pp. 523-533 (Mar. 1999).

* cited by examiner

METHOD AND SYSTEM FOR COMPENSATING FOR PARALLAX IN MULTIPLE CAMERA SYSTEMS

CLAIM OF PRIORITY

This application is a divisional of application Ser. No. 09/989,638 entitled METHOD AND SYSTEM FOR COMPENSATING FOR PARALLAX IN MULTIPLE CAMERA SYSTEMS, filed Nov. 20, 2001, inventor Jonathan T. Foote, which is a continuation-in-part of application Ser. No. 09/370,406 entitled "AUTOMATIC VIDEO SYSTEM USING MULTIPLE CAMERAS" filed Aug. 9, 1999, inventors Jonathan T. Foote, Subutai Ahmad and John Boreczky.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to video systems and composition of multiple digital images. The invention is more particularly related to the composition of multiple digital images each captured by an individual camera of a camera array, and to a method and system for warping and combining at least portions of images so that a single image can be produced without seams or object disparity.

BACKGROUND

Remote and locally located cameras typically include devices for camera control. Devices include stepping motors or other mechanisms configured to point the camera or an image capturing device toward a scene or point of interest. Examples include teleconferencing applications, surveillance cameras, security cameras, cameras that are remotely controlled, activated by motion, light or other stimuli, remote sensing cameras such as those placed on robotic means (examples including those used in space exploration, deep sea diving, and for sensing areas or scenes to dangerous or inaccessible for normal camera operations (inside nuclear reactor cores, inside pipes, police cars, or law enforcement robotics, for example).

Normally, cameras are manually operated by a human operator on site, or remotely controlling the camera via a steering input (joystick or mouse, for example). In the case of remotely steered cameras, steering inputs generally activate a control program that sends commands to a stepping motor or other control device to steer a camera toward an object, item, or area of interest. General zooming functions of the camera may also be activated either on site or remotely.

In the case of teleconferencing applications (meetings, lectures, etc.), a variable angle camera with a mechanical tilt, pan, focal length, and zoom capability is normally used. Such devices generally require a human operator to orient, zoom, and focus a video or motion picture camera. In some cases, conference participants may be required to activate a specific camera or signal attention of a camera configured to zoom in or focus on selected areas of a conference room.

Multiple cameras have been utilized in a number of applications. For example, Braun et al., U.S. Pat. No. 5,187,571, "TELEVISION SYSTEM FOR DISPLAYING MULTIPLE VIEWS OF A REMOTE LOCATION," teaches an NTSC camera array arranged to form an aggregate field, and Henley, U.S. Pat. No. 5,657,073, "SEAMLESS MULTI-CAMERA PANORAMIC IMAGING WITH DISTORTION CORRECTION AND A SELECTABLE FIELD OF VIEW," teaches a system for production of panoramic/panospheric output images.

Applications for multiple or steerable cameras include teleconferencing systems that typically direct a camera toward a speaker who is then broadcast to other teleconference participants. Direction of the camera(s) can be performed manually, or may utilize a tracking mechanism to determine a steering direction. Some known tracking mechanisms include, Wang et al., "A Hybrid Real-Time Face Tracking System," in Proc. ICASSP '98, and, Chu, "Superdirective Microphone Array for a Set-Top Videoconferencing System," In Proc. ICASSP '97.

However, technical challenges and costs have prevented such systems from becoming common and in wide spread use.

Systems attempting to integrate multiple images have failed to meet the needs or goals of users. For example, McCutchen, U.S. Pat. No. 5,703,604, "IMMERSIVE DODECAHEDRAL VIDEO VIEWING SYSTEM," teaches an array of video cameras arrayed in a dodecahedron for a complete spherical field of view. Images are composed at the receiving end by using multiple projectors on a hemispherical or spherical dome. However, the approach taught in McCutchen will suffer problems at image boundaries, as the multiple images will not register perfectly and result in obvious "seams." Additionally, object disparity may result due to combining overlapping images taken from multiple cameras.

In another example, Henley et al., U.S. Pat. No. 5,657,073, "SEAMLESS MULTI-CAMERA PANORAMIC IMAGING WITH DISTORTION CORRECTION AND SELECTABLE FIELD OF VIEW," teaches combining images from radially-arranged cameras. However, Henley fails to disclose any but radially-arranged cameras, and does not provide details on image composition methods.

In another example, Nalwa, U.S. Pat. No. 5,745,305 issued on Apr. 28, 1998, entitled "PANORAMIC VIEWING APPARATUS," teaches a four-sided pyramid-shaped element to reflect images from four different directions to four different cameras. Each camera is positioned to receive a reflected image from one of the reflective sides of the pyramids. The cameras are arranged so that they share a perceived Center Of Projection ("COP") located at the center of the pyramid. A common COP means there can be no overlap region to blend camera images, so seams will be more apparent.

Panoramic viewing systems using optical means to achieve a common COP are expensive and difficult to manufacture to the necessary degree of precision. Manufacturing requires precision alignment of the pyramid and cameras to generate the perceived COP. If one of the cameras is initially misaligned, subsequently moved or the pyramid element is shifted, distortion may occur between combined images.

Accordingly, there is a desire to provide a cheaper, more reliable, and faster multiple camera viewing system for generating panoramic images.

SUMMARY

Roughly described, the present invention utilizes a camera array to capture plural piecewise continuous images of a scene. Each of the images are warped to a common coordinate system and overlapping images are combined using a technique to reduce parallax, thereby producing a single, seamless image of the scene.

According to an aspect of the invention, cameras are registered such that the processing equipment used to combine the images knows which parts of each image are overlapping or have the same points of the scene captured such that they may be precisely combined into a single image or scene.

Each captured image is warped to a common coordinate system and points of a scene captured by two or more cameras are combined into a single point or set of points appropriately positioned according to the scene being captured. Disparity correction may be used to combine overlapping images. Blending techniques may also be applied to edges of each of the images to remove any brightness or contrast differences between the combined images.

In an example, the present invention may be embodied in a device, or a camera array, comprising, a set of cameras mounted in an array, an image combining mechanism configured to combine at least two images captured from said set of cameras into a composite image, a view selection device configured to select a view from the composite image, and an output mechanism configured to display the selected view.

Another aspect of the invention may also include a method of registering a camera array, comprising the steps of, placing at least one registration point in a field of view of at least two cameras of said camera array, identifying a location of each registration point in a field of view of each camera of said array, and maintaining information about each registration point in relation to each camera such that images may be combined in relation to said registration points.

According to another aspect, a method for combining at least a portion of a plurality of images is provided. The method obtains a first image and a second image, wherein at least a portion of said first image and said second image include a common field of view. After obtaining the images, the method adjusts at least a portion of one of the images to reduce image disparity between the common field of view of the images and combines at least a portion of the first and second images to form a composite image.

In still another aspect, a method for combining frames of video from a plurality of cameras arranged in a camera array is provided. The method includes the steps of obtaining a first frame from a first camera, and a second frame from a second camera, wherein at least a portion of said first frame and said second frame include a common field of view, stretching at least a portion of said first frame to reduce an image disparity between said common field of view of said first frame and said second frame and, combining said common field of view of said first frame and said second frame subsequent to said step of stretching.

According to another aspect, a method for combining a plurality of images captured from a plurality of cameras of a camera array into a panoramic image is provided. The method includes the steps of adjusting a first portion of a first image to reduce image disparity between said first portion of said first image and a second image, adjusting a second portion of said first image to reduce image disparity between said second portion of said first image and a third image; and, combining said first image, said second image, and said third image into a panoramic image.

According to still another aspect, an apparatus for producing a panoramic video is provided. The apparatus comprises a camera array including a plurality of cameras and an image obtaining device. The image obtaining device is configured to obtain images from the cameras in the camera array which share a common field of view. The apparatus also include an image adjustor which is configured to adjust at least a portion of said first image to reduce an image disparity between said common field of view of said first image and said second image. An image combiner is also included in the apparatus which combines at least a portion of images after adjusting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

A "frame" as described herein is a single capture (image) of objects in a field of view of a camera. Motion video consists of a time sequence of frames typically taken at a video rate often to thirty frames per second.

"Parallax" as described herein is the apparent change in the location of an object, caused by a change in observation position that provides a new line of sight. Parallax occurs as a result of two cameras having different COP's. When images from cameras having different COP's are combined without alteration, disparity between the objects of the combined images results and objects appear "ghosted" or doubled in the composite image.

A "common field of view" as described herein is an image or a portion of an image of a scene which is viewed by more than one camera.

Figure 1A:
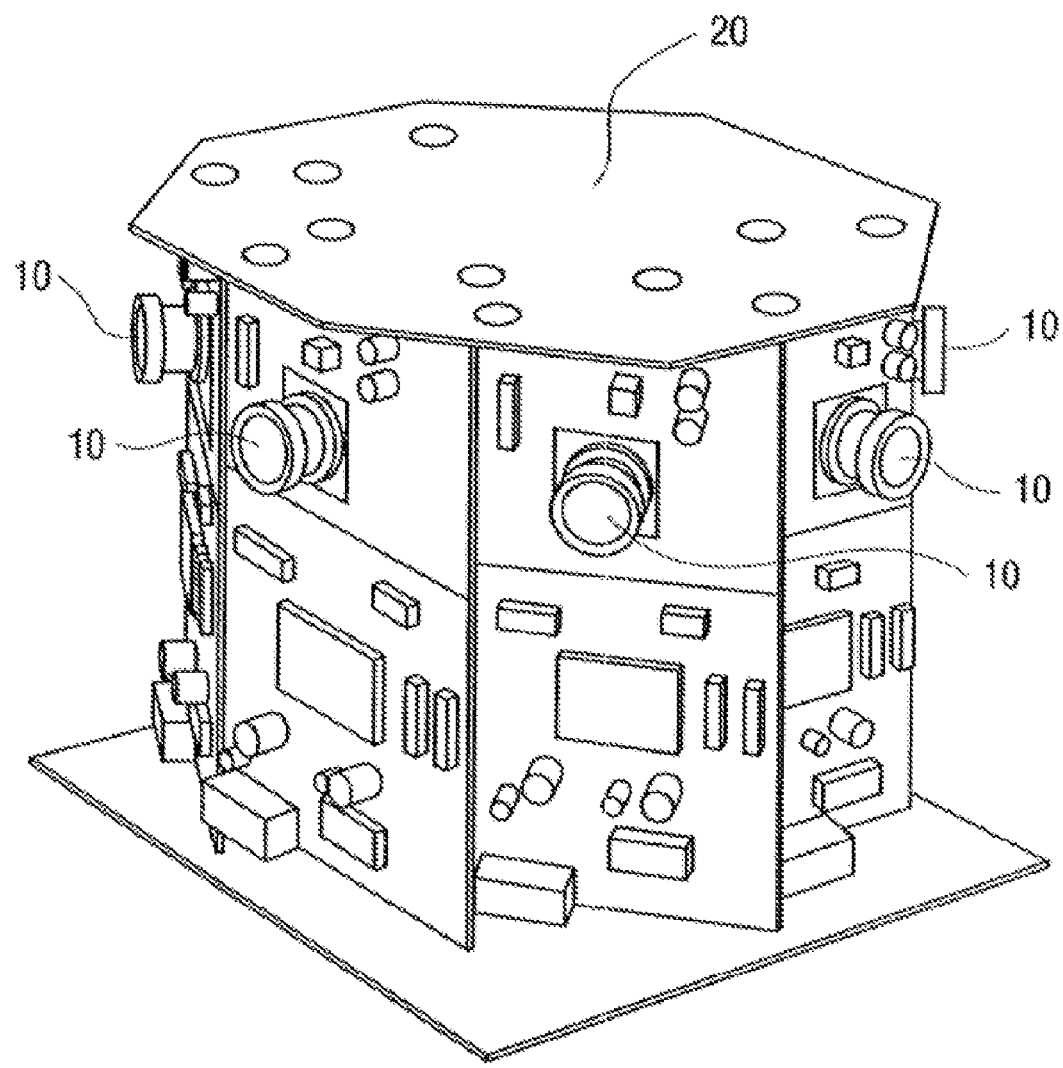
FIG. 1A is an example of a circular array of video cameras, according to the present invention.

Referring now to the drawings, wherein like reference numerals designate identical or corresponding parts, and more particularly to FIG. 1A thereof, there is illustrated an example of a circular array of video cameras, according to an embodiment of the present invention. In FIG. 1A, multiple video cameras 10 are mounted on a rigid substrate 20 such that each camera's field of view overlaps that of its neighbor. The resulting images are aligned using digital warping and objects are matched using disparity reduction techniques to form a large composite image. The result is a seamless high-resolution video image spanning the field of view of all cameras. If the cameras are mounted in fixed positions relative to each other, image registration between the different cameras is also fixed, and the same composition function can be used for each frame. Thus the interpolation parameters need only be calculated once, and the actual image composition and disparity reduction can be done quickly and efficiently, even at video rates.

Figure 1B:
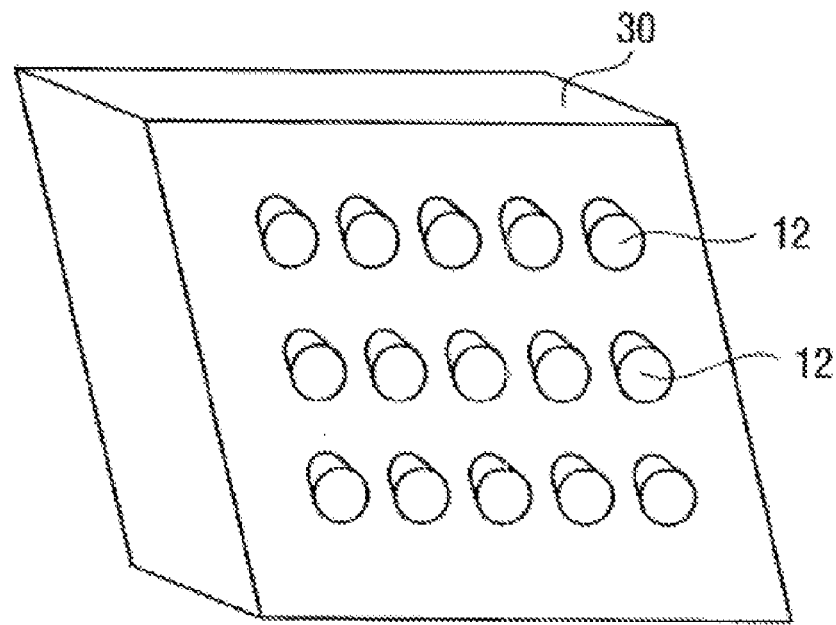
FIG. 1B is an example planar array of digital cameras, according to the present invention.
Figure 1C:
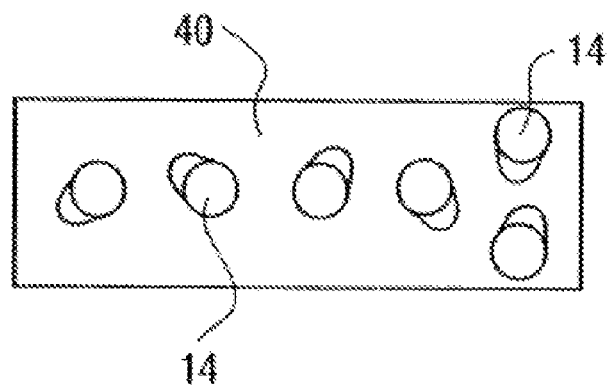
FIG. 1C is a second example of a linear array of digital cameras, according to the present invention.

Other configurations of cameras are also possible. For example, FIG. 1B illustrates a planar array of cameras 12 mounted on a rigid plane substrate 30, and FIG. 1C illustrates a linear array of cameras 14, each mounted on a rigid substrate 40, according to an embodiment of the invention. The cameras may be aligned in various directions. For example, in FIG. 1B, the cameras are generally aligned in a same direction (with overlapping views as described above), while a more diverse alignment is seen in FIG. 1C (still generally having overlapping and abutting areas, for example).

For many applications, such as video conferencing, it is neither desirable nor possible to transmit a full-motion super-resolution image. According to an embodiment of the present invention, a method for extracting a normal-resolution image using measures of motion, audio source location, or face location within the image is provided. However, since multiple cameras and plural images of a same scene are envisioned, super-resolution processes (getting higher resolution, e.g., more pixels, from multiple images of a same scene) may be applied. When the multiple images are registered, any normal-sized sub-image can then be selected by excerpting a frame from the larger composite, as shown in FIG. 2A.

Figure 2A:
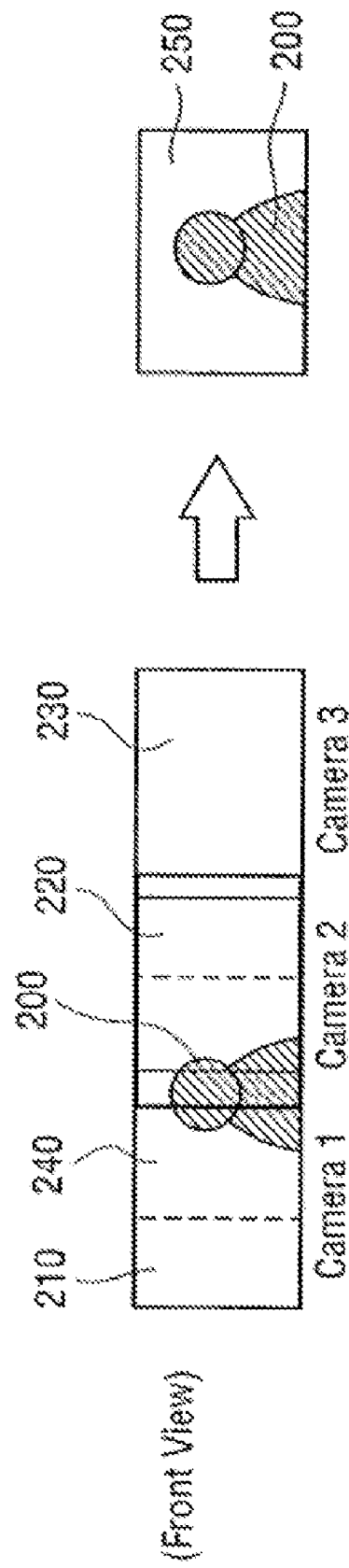
FIG. 2A is an illustration of combined images from multiple cameras and a selection of a "virtual camera" view, according to an embodiment of the present invention.

FIG. 2A illustrates views from 3 cameras, camera 1 view 210, camera 2 view 220, and camera 3 view 230, according to an embodiment of the present invention. A conference participant 200, and the participants frame of reference (an area of interest 240) is at or near abutting images from each of camera 1 view 210 and camera 2 view 220. The abutting areas are combined into a single panoramic image and the area of interest 240 (including participant 200) can be selected therefrom. Camera 3 view 230 may also be combined into the single panoramic image, or, alternatively, because it shows none of the area of interest 240, it may be discarded. The selected combined image 250 (representing the area of interest 240) is the result.

Because embodiments of the present invention allow any desired sub-image to be selected, changing the selected region is equivalent to steering a "virtual camera." The camera array can be constructed with long-focal-length cameras, such that each array element is "zoomed in" on a small region. Combining many of these zoomed-in images and reducing the resolution is equivalent to zooming out. Thus all the parameters of conventional cameras such as pan (selecting a different area of the panoramic image), zoom (combining or discarding images and changing resolution), and tilt (selecting images from cameras at specific angles, i.e., elevated cameras, for example) can be effectively duplicated with an array of fixed cameras.

Unlike mechanically-steered cameras which have a finite slew rate limited by motor speed and inertia, a virtual camera can be instantaneously panned anywhere in the camera array's field of view. Multiple virtual cameras can be simultaneously extracted from the same array, allowing multiple users to view different areas at the same time. This might be particularly useful in telepresence applications, for example a sports event, where each user could control a "personal virtual camera."

Figure 2B:
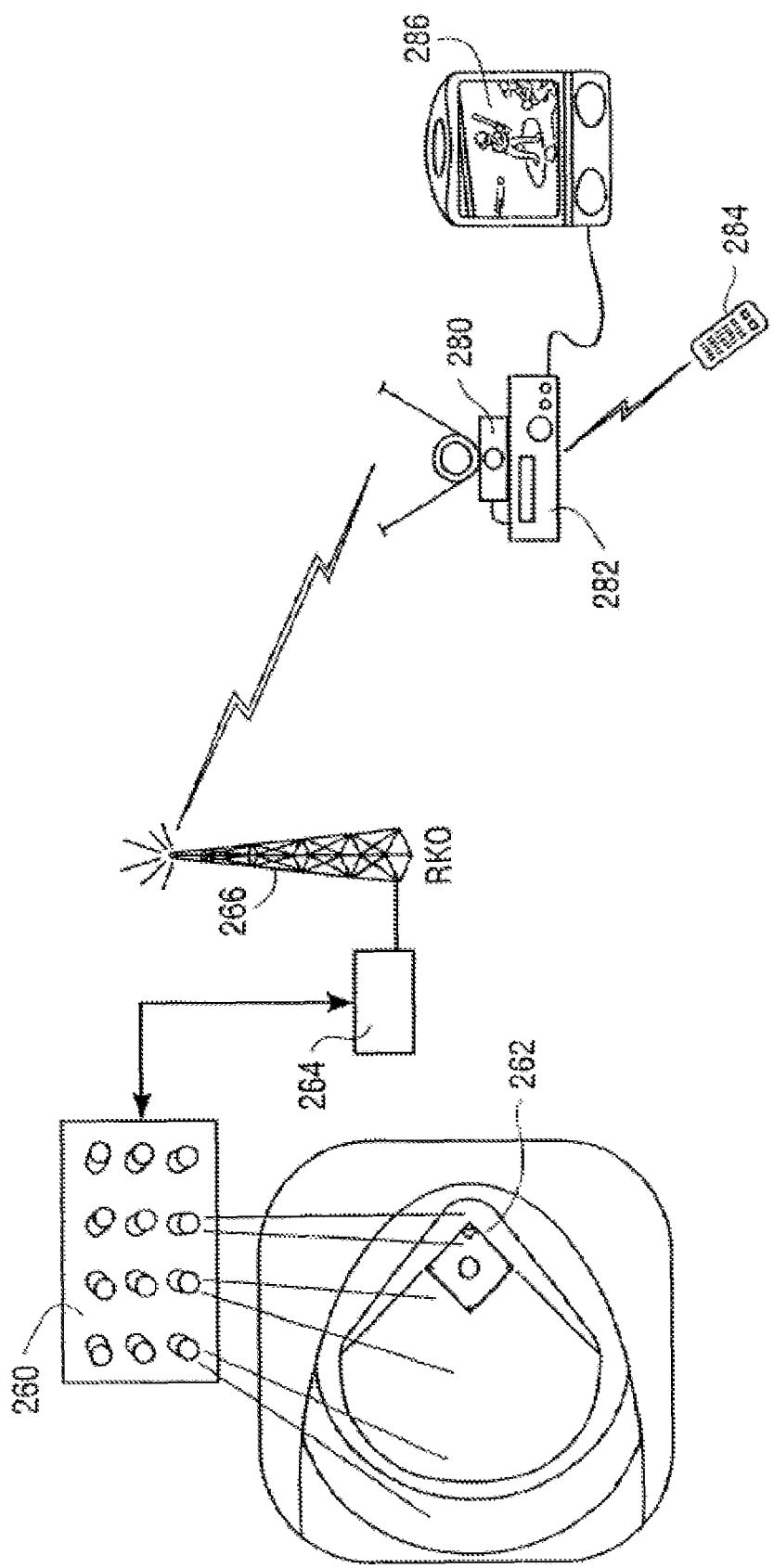
FIG. 2B is a block diagram/illustration of some of the possible applications of a process according to an embodiment of the present invention.

For example, one embodiment of the present invention is illustrated in FIG. 2B. A camera array 260 is trained on, for example, a sporting event 262. Video streams from the cameras are then packaged, compressed, and prepared for broadcast at a broadcast station 264, and broadcast via cable, Internet, airwaves (broadcast tower 266, for example), or other broadcasting media/modes. At a receiving end, a receiving device (antennas 280, for example), receive the broadcast signal, and a user station 282 combines the images received in the broadcast to a single panoramic view. A user (not shown) selects a desired view via control device 284, resulting in a display 286, for example.

To save broadcast bandwidth, signals from control device 284 may be broadcast back to a source (broadcast station 264 in this example) to identify only the specific video streams needed to produce the display 286. In another alternative the entire display 286 may be composed at the source and only the display 286 is broadcast to the user. A specific configuration would be selected based on the availability of broadcast bandwidth and processing power available at each of broadcast station 264 and user station 282. As will be appreciated by those skilled in the art, any number of combinations or modifications may be implemented, consistent with the invention as described herein.

Camera arrays can have any arrangement, such as radial (FIGS. 1A and 3, for example), linear, planar (FIGS. 1B, 1C, and 4, for example), covering the walls of a room, or even attached to the edge of a table or other object. A location and angle of each of the cameras in the camera array is fixed with respect to each other camera. Therefore, the entire camera array may be moved without any re-calibration (re-registration) or recalculation of the matrix equations for transforming the individual images into a single panoramic scene.

Although normally fixed on a platform or other substrate, it is consistent with an embodiment of this invention to have a camera array with cameras movable with respect to each other and employ a registration process that would re-register each camera in the camera array after movement. In addition, facilities for additional or auxiliary cameras may be attached or included in the array, and again, a registration process so that any cameras added to the array can benefit from the fast warping/transformation and parallax reduction techniques described herein.

Figure 3:
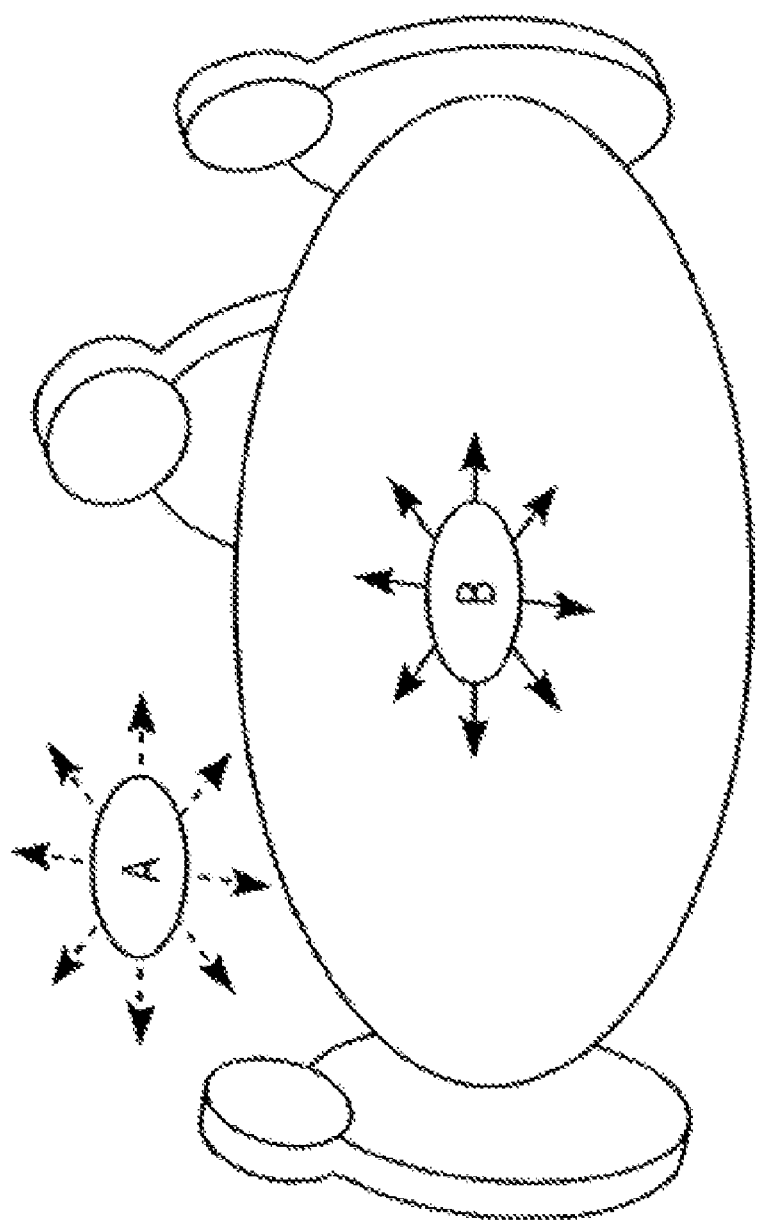
FIG. 3 is an illustration showing example placements and example camera angles of a circular camera array utilized in a teleconferencing application, according to an embodiment of the present invention.

Referring now to FIG. 3, a radial array of cameras is suitable for video conferencing, having a 360-degree field of view, the radial array is centered on a fixed point, such as the center of a conference table (labeled "B" in FIG. 3). A similar array is useful for immersive telepresence or other applications (discussed below). An array situated at "A," in FIG. 3, gives the impression of being seated at the table.

A similar array could be mounted on a mobile platform for other telepresence applications. The ability to instantaneously pan without distracting camera motion is an improvement over current telepresence systems. For example, another application, police robotics, require a mechanized camera to proceed into a hostile environment for reconnaissance purposes. Mobile and equipped with a video camera, remote panning means, and microphones, the devices proceed into a hostile environment. When a threat is detected, the camera pans toward the threat to inspect it, however, the device is limited by pan and zoom time parameters. Alternatively, a radial array according to an embodiment of the present invention, mounted on the same robotic device, would be able to instantly pan to evaluate the threat, have multiple redundancy of cameras, and be able to self locate the threat via microphone or motion detection as described hereinbelow.

Camera arrays, according to an embodiment of the present invention, can be constructed in any desired configuration, and put anywhere convenient. A two-dimensional camera array may be constructed to facilitate electronic zooming as well as panning. For example, a first dimension of an array might cover/or be directed towards a full view of a conference room or scene, while a second array would have cameras directed toward specific points of interest within the scene (see FIG. 1C, for example). Example placement of camera arrays would include an edge of a table, on the ceiling at an angle, or even covering an entire wall or walls of a room. Automatic switching or electronic panning could then ensure an appropriate image of any event in the room, and no part of any scene would ever be out of camera view.

Figure 4A:
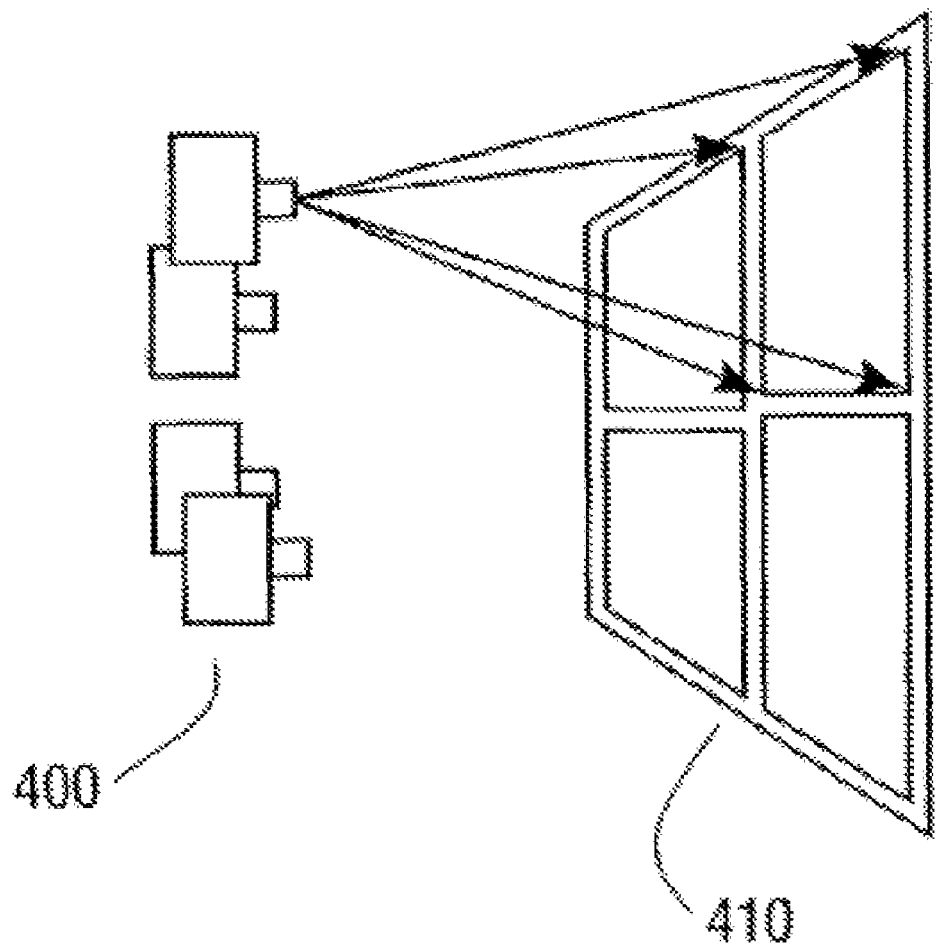
FIG. 4A is an illustration of a planar camera array, according to an embodiment of the present invention.

FIG. 4A shows another application having cameras 400 arrayed in a planar configuration, according to an embodiment of the present invention. Each of cameras 400 is directed to a specific one of abutting regions 410, and a user may select any view covered by any combination of the cameras, allowing up/down panning as well as a good zoom range.

Figure 4B:
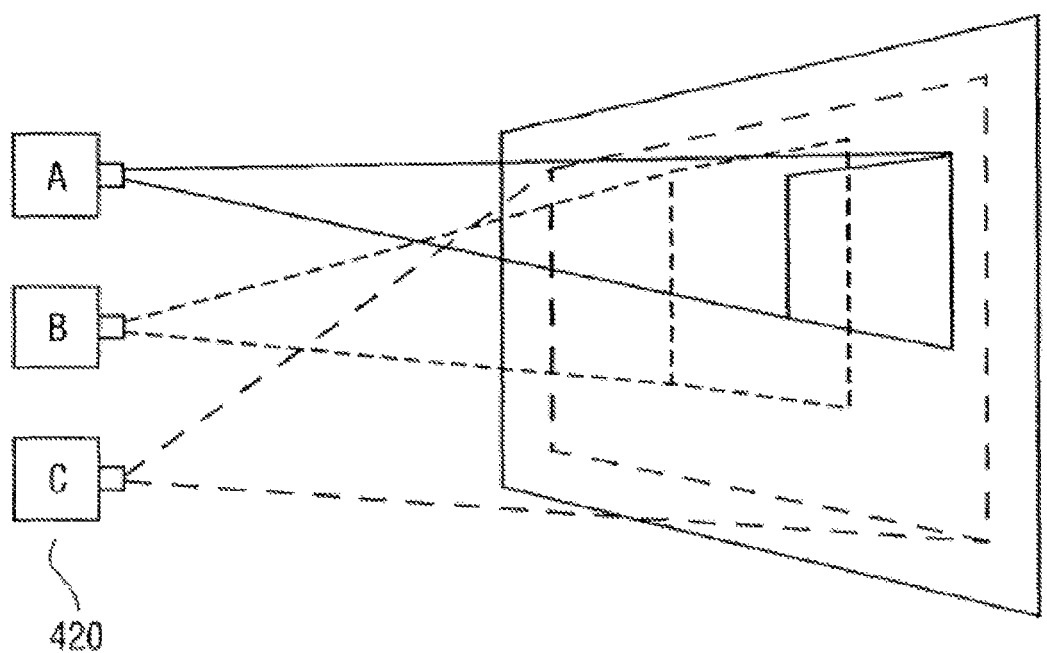
FIG. 4B is an illustration of a planar camera array and example specific views onto a scene, according to an embodiment of the present invention.
Figure 4C:
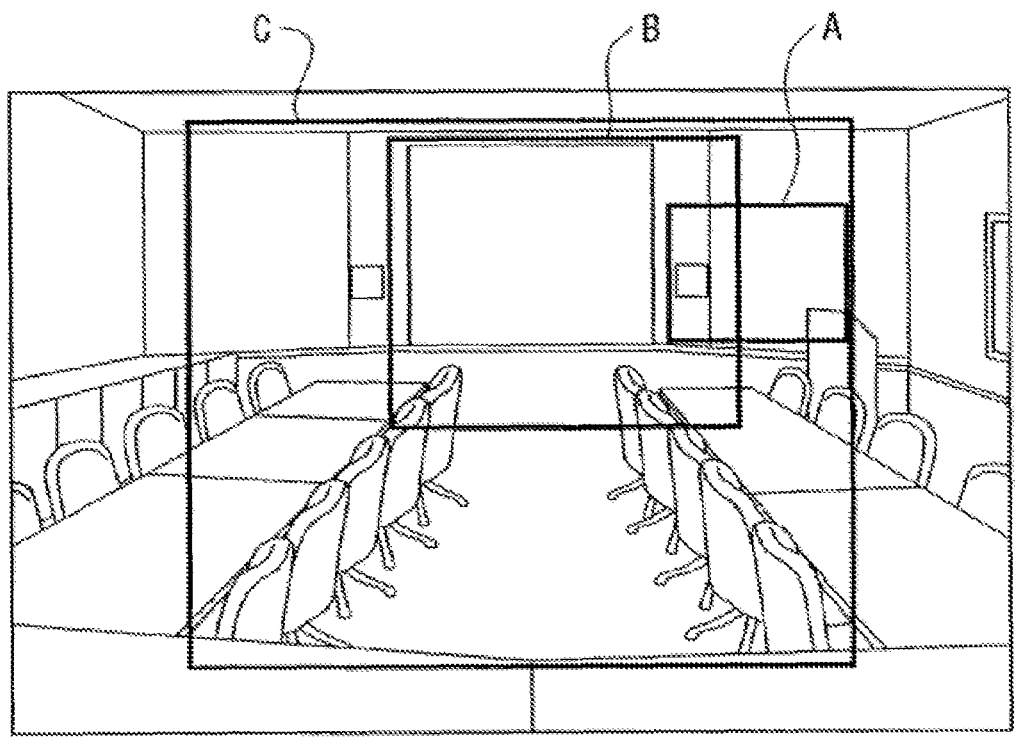
FIG. 4C is a conference/presentation room illustrating views A, B, and C of a camera array, according to an embodiment of the present invention.

FIG. 4B illustrates an alternate configuration having cameras 420 (A, B, and C, respectively) directed to specific areas, either abutting or overlapping other camera views, according to an embodiment of the present invention. In this case, specific camera views are directed toward areas of particular interest within a scene (resulting in views A, B, and C, as shown in FIG. 4C, for example). The configuration of FIGS. 4B/4C is appropriate for a lecture or conference room application, where the appropriate camera operations is to zoom and pan to follow the speaker, zoom in on the display screen, and zoom out to cover audience questions or reactions.

The prior art has failed to adequately resolve the challenging technical constraints of a camera array. Several major problems must be addressed: combining multiple video streams into a seamless composite, calibrating the array cameras, and handling the extreme data rate of the composite high-resolution video.

Image Warping

Figure 5A:
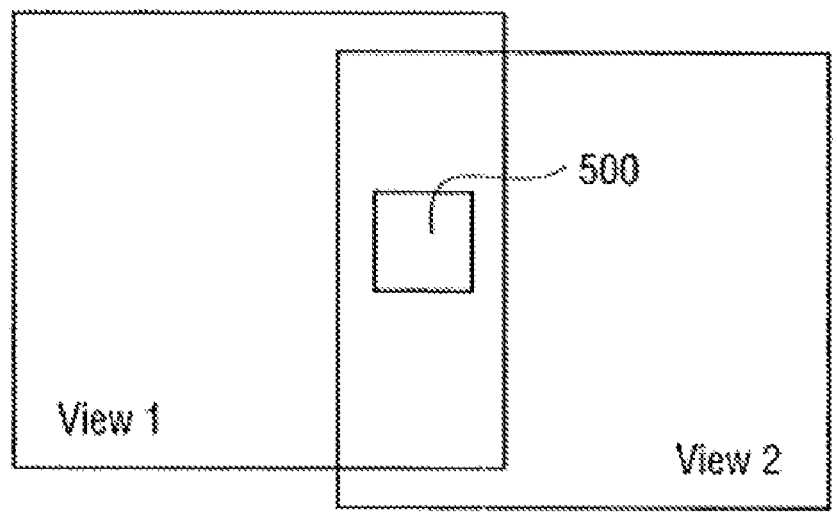
FIG. 5A is an example of an object to be imaged by two separate cameras, according to an embodiment of the present invention.

In an embodiment of the present invention, stitching adjacent frames together is accomplished using a method or combination of methods that combine separate images into a panoramic, or combined image. In one embodiment, a spatial transformation (warping) of quadrilateral regions is used, which merges at least two images into one larger image, without loss of generality to multiple images. First, a number of image registration points are determined; that is, fixed points that are imaged at known locations in each sub-image. This can be done either manually or automatically. In either case the process involves pointing the array at a known, structured scene and finding corresponding points. For example, FIG. 5A illustrates views of two cameras trained on a scene that includes a rectangular box 500. The rectangular box 500 is in an area of overlap between a View 1 and View 2 (each View 1 and View 2 corresponding to an approximate field of view captured from one of the two cameras). Therefore, each of the points of rectangular box 500 would constitute image registration points (points in common to views of each of two or more cameras of the camera array).

Figure 5B:
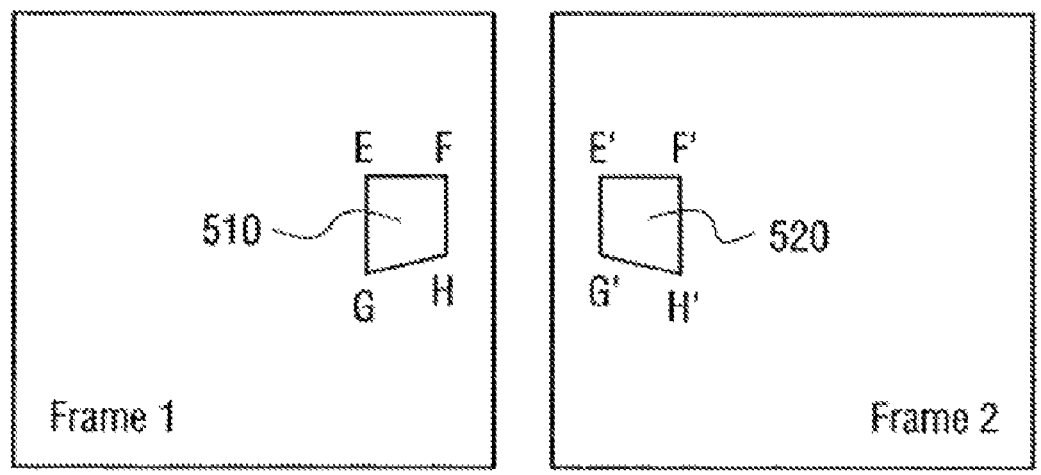
FIG. 5B is an example of frames from individual cameras imaging a same object, according to an embodiment of the present invention.

FIG. 5B illustrates the rectangular box 500 as captured in an actual frame of the two cameras corresponding to View 1 and View 2 of FIG. 5A, as abutting frames, frame 1 and frame 2. The box is a quadrilateral area EFGH 510 in frame 1, and E'F'G'H' 520 in frame 2, and, because of the slightly different camera angles, the quadrilateral areas are not consistent in angular construction and are captured in different locations with respect to other objects in the image. Therefore, the present invention matches the abutting frames by warping each of the quadrilateral regions into a common coordinate system. Note that the sides of quadrilateral area EFGH are shown as straight, but may actually be subject to some barrel or pincushion distortion, which can also be approximately corrected via the fast warping equations (discussed below). Barrel/pincushion distortion can be corrected using radial (rather than piecewise linear) transforms. Piecewise linear transforms can fix an approximation of the curve.

Alternatively, only one of the images need be warped to match a coordinate system of the other image. For example, warping of quadrilateral area EFGH may be performed via a perspective transformation. Thus quadrilateral EFGH in Frame 1 can be transformed to E'F'G'H' in the coordinate system of Frame 2.

Figure 6:
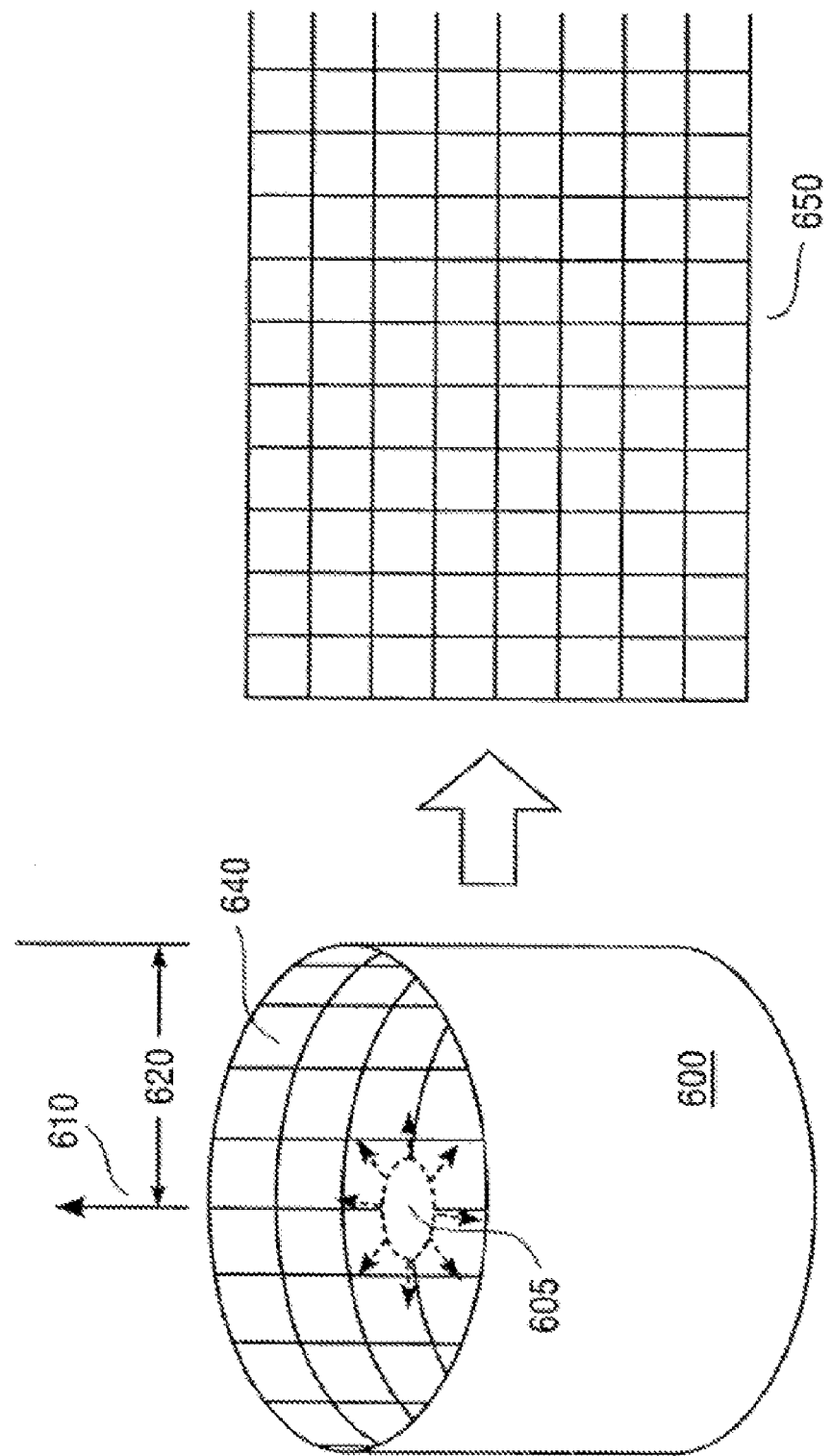
FIG. 6 is an example of calibration points and patches in raw images and an illustration of a flat panorama constructed from the raw images, according to an embodiment of the present invention.

In another embodiment, bilinear warping (transformation) of piecewise-contiguous quadrilateral regions is used. Referring now to FIG. 6, an example of how multiple images are merged into one larger image, without loss of generality to the multiple images (also referred to as sub-images) according to an embodiment of the present invention is described. First, a number of image registration points are determined; that is, fixed points that are imaged at known locations in each sub-image. In this embodiment, the fixed points at known locations consist of a cylinder 600 coaxial with a camera array axis 610, and having a radius 620 of about the working range of the camera (in an embodiment, about a meter). A wide angle camera is used having a small f stop, thereby providing a large depth of field where everything beyond approximately 1 meter is in focus.

Figure 7:
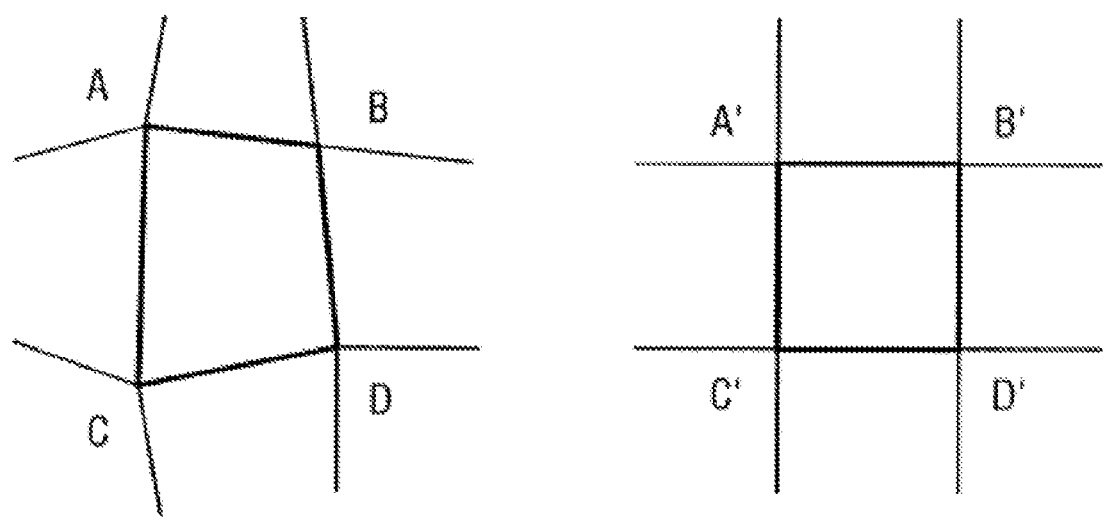
FIG. 7 is an example of a warping of a quadrilateral patch ABCD into a square A'B'C'D', according to an embodiment of the present invention.

Square patches on the cylinder (640, for example) are imaged as quadrilateral regions by one or more cameras. The imaged quadrilateral regions are illustrated, for example, as quadrilateral region ABCD as seen in FIG. 7, a patch, and may also be referred to as a source polygon. Each quadrilateral region (source polygon, or patch) is warped back to a square, and the final panoramic image 650 (also referred to as a destination image) is composited by abutting each square in a grid (also referred to as placing the squares, or warped quadrilateral regions, into a common coordinate system). Different camera images are merged by either abutting adjacent squares in a grid or combining overlapping squares (described below) resulting in panoramic image 650.

Bilinear transformations may be used to warp the quadrilateral regions (bilinear warping). Equation 1 below transforms the homogeneous coordinate system u, v to the warped (square) coordinate system x, y.

$$[x \ y] = [u \ v \ uv \ 1] \begin{vmatrix} a0 & b0 \\ a1 & b1 \\ a2 & b2 \\ a3 & b3 \end{vmatrix} \quad (1)$$

Equation 1 is a transformation matrix having 8 unknown coefficients that are determined by solving the simultaneous equations given by the reference points (ABCD, in a coordinate system u, v, and A'B'C'D', in a coordinate system x, y). The four points in each system have 8 scalar values to solve for the 8 unknown parameters. If more correspondence points (correspondence points referring to the points encompassing the quadrilateral region (ABCD in this example) are present, an overdetermined set of equations results, which can be solved using least-squares (pseudo inverse) methods for more robust estimates.

The above processes may be repeated for every patch (each patch captured by one or more cameras; at least two sets of patches along borders of images one from each image to be combined; each path determined along a border of combined images), and using equation (1) (or an equivalent equation performing the same function for the areas selected), a set of warping coefficients (eight coefficients in this example) are computed for every patch. These, as well as the location of the square destination region in the composite image, are referred to as warping coefficients or a calibration set.

To calculate a pixel value in the warped coordinate system x, y, the above equations are inverted by solving for u, v in terms of x, y. This allows for what is termed "inverse mapping." For every pixel in the warped coordinate system, the corresponding pixel in the unwarped system is found and its value is copied.

The coefficients (of equation 1, for example) are stored in a table and utilized to warp images "on the fly." Because the cameras are fixed, and registered (or calibrated, see later section), the same equations are utilized over and over for the same patches (i.e., no need to find new correspondence or registration points, or recalculate coefficients).

Because warping is a continuous function rather than discrete, the reverse mapping will generally yield non-integral unwarped coordinates. For this reason, the pixel value is interpolated from the neighbors using bilinear interpolation. This uses a linear combination of the four closest integral points to produce the interpolated value.

Other embodiments include different types of spatial transformations to warp patches from captured images (u,v coordinate system) to a composite grid (x,y coordinate system). Any spatial transformation altering the captured images to fit into a composite grid would be consistent with the present invention. For example, affine, or perspective transformations may be utilized.

According to one embodiment, registration is performed manually by inspecting each camera's image. This is not an excessive burden as it need only be done once, and can be automated.

Figure 8:
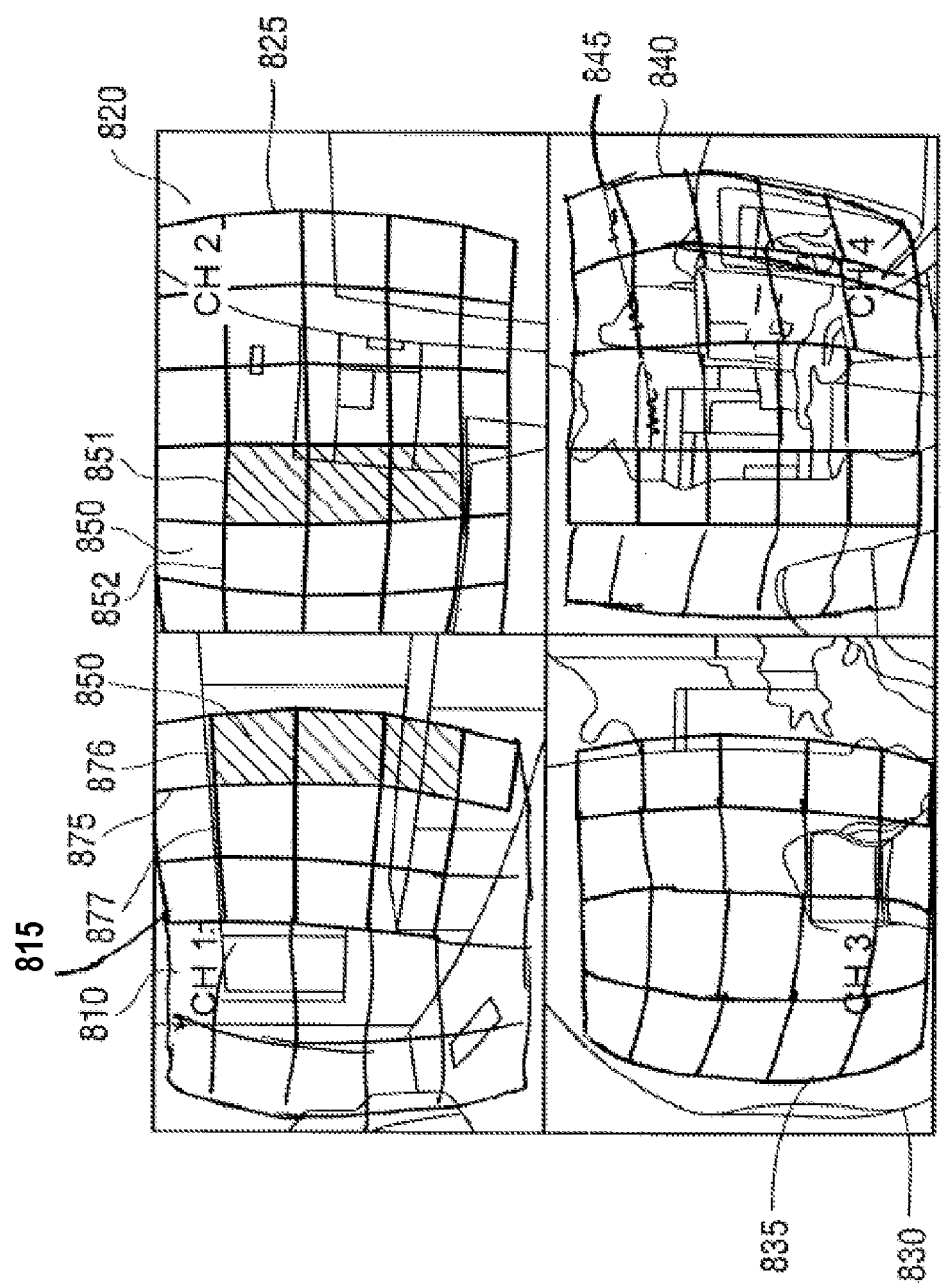
FIG. 8 is an example of images input from 4 sources showing patches, according to an embodiment of the present invention.

FIG. 8 provides an example of calibration points and patches in raw images (images taken from a camera, without having any warping or other processing applied), according to an embodiment of the invention. Image 810, 820, 830 and 840 are abutting images taken from consecutively aligned cameras on a scene. Each image has a grid 815, 825, 835, and 845 having source polygons that will be warped into a common coordinate system resulting in a contiguous image of the scene. In addition, hatched columns 851 and 876 (seen in both camera images) are combined, while column 877 and column 852 may be either utilized as is, discarded, or combined.

An embodiment of the present invention also includes correction for lens distortions in the fast warping equations. For example the camera lenses utilized in FIG. 8 shows a substantial amount of barrel distortion. Note the right edge of partition 850 shown on the right side of image 810 (bulging to the right), and the right edge of partition 850 shown in the left side of image 820 (bulging to the left). In one embodiment, correction of lens non-linearities or distortions is built into the fast warping equations (using a radial transformation, for example). In another embodiment, such abnormalities are corrected by increasing the number of patches (registration points), and the resulting warped images making a better approximation of the actual scene being imaged (a piecewise approximation of a continuous distortion).

Parallax Compensation

Because it is impractical to make a camera array with each camera having a common COP, camera arrays will have a small but significant baseline separation. This is a problem when combining images of objects at different distances from the baseline, as a single warping function will only work perfectly for one particular distance. Images of objects not at that distance may be warped into different places—resulting in image disparity—and may appear doubled ("ghosted") or truncated when the images are merged.

According to an embodiment of the present invention, image disparity can be reduced by adjusting the images to determine a minimum disparity between the images being merged. In this embodiment, the camera array is calibrated such that objects at a particular distance, or images of smooth backgrounds, can be combined with no visible disparity. A minimum disparity can be found by determining how much to shift one image to match the other. This type of camera calibration greatly simplifies the stereo matching problem, turning it into essentially a one-dimensional search. Because images are warped into corresponding squares, all that is necessary is to find a particular shift that will match them.

Figure 9A:
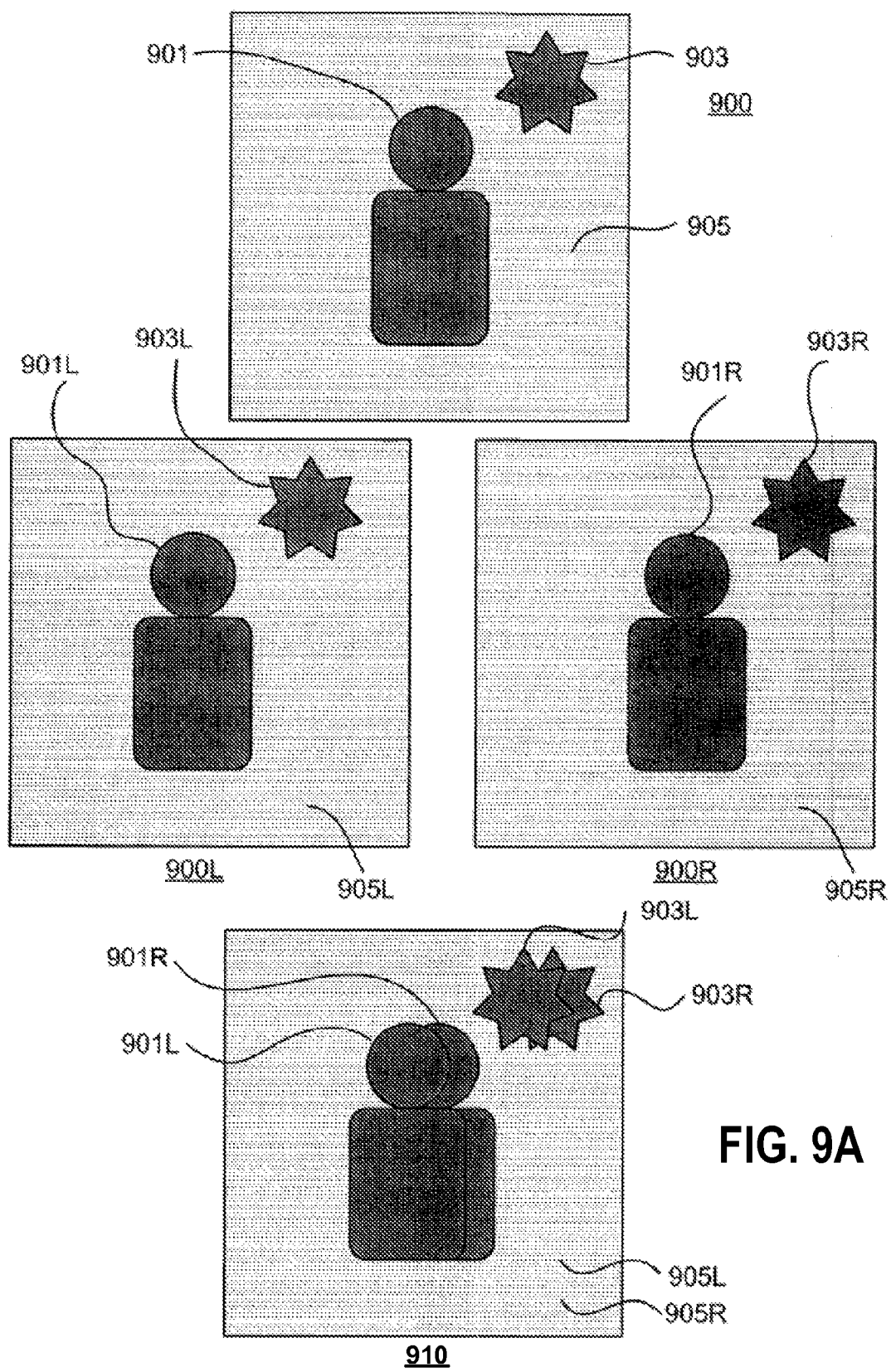
FIG. 9A illustrates an example of an original scene of objects as viewed by two cameras of a camera array, according to an embodiment of the present invention.

FIG. 9A illustrates a scene 900 containing objects 901, 903, and background 905. When scene 900 is viewed using a multiple-camera viewing system having two cameras with different COP, a left camera and a right camera as described above, the warped images 900L and 900R of scene 900 appear different. Image 900L illustrates the scene 900 as viewed by a left camera after the image has been warped into a common coordinate system. Image 900L includes images 901L, 903L and background 905L of objects 901, 903 and 905 as viewed by a left camera array. Image 900R illustrates the view of scene 900 as it is viewed from a right camera of a camera array after the image has been warped. Image 900R contains images 901R, 903R and background 905R of objects 901, 903 and 905. Directly overlaying the images 900L, 900R results in a combined image similar to that of image 910 as illustrated in FIG. 9A.

As can be seen in image 910, images 901L and 901R are not lined up with one another due to the way scene 900 is viewed by cameras with different COP. Similarly, images 903R and 903L are likewise not lined up exactly with one another. However as can be seen, the combined background images 905R and 905L, which correspond to the original background 905, do not result in any discernable disparity because the background is uniform throughout the scene 900.

In an embodiment, disparity may be reduced by shifting one or both of the images 900L, 900R so that disparity between images 901L, 901R, 903L, 903R is reduced. To determine how far to shift the image or images, a disparity estimation technique, or a combination of disparity estimation techniques, may be performed to determine disparity differences between the images at different amounts of shift.

Disparity estimation techniques may be used to determine the disparity between objects imaged in two images, such as images 901L and 901R of images 900L and 900R. According to an embodiment of the present invention, any number of disparity estimation techniques, or combination of techniques, may be used to generate a numerical disparity value.

One such disparity estimation technique is the pixel-wise difference magnitude technique ("PDM"). PDM calculates the sum of the difference of all pixel values of two corresponding images, such as images 900L and 900R. The pixel difference is typically squared, or the absolute value is taken, to result in a positive magnitude before summation.

Another disparity estimation technique is known as normalized pixel difference ("NPD"). NPD determines disparity by normalizing or scaling the pixels from both source images to correct for camera intensity or color differences. Then the difference magnitude may be calculated using another disparity technique, such as PDM.

Still another technique for determining disparity between images utilizes an edge detector or other gradient or linear operation before the difference magnitude is computed, as described above.

Another disparity estimation technique is known as color or intensity histogram differences ("CIHD"). Using this technique, the count of pixels having intensities within specified bins is used to characterize each image region. These histogram counts may be subtracted and a difference magnitude computed.

Another technique is frequency-domain comparisons ("FDC"). Using this technique, a spatial transform such as a two-dimensional Fourier transform or wavelet transform may be used to parameterize image regions into transform coefficients. The magnitude difference can be computed between the transform coefficients, which can be selected or weighted to favor or discard particular spatial frequencies.

Statistical comparisons may also be used to compare the image regions, for example the distribution of pixel intensities can be modeled with a multivariate Gaussian distribution for an image region. Gaussian distributions can be compared using one of several distance measures, such as the Karhunen-Loeve measure.

Still another technique is known as feature-based comparisons ("FBC"). According to this technique, image regions may be compared by extracting any number of features, such as connected regions or lines having similar color or texture. The features may be compared by size, color, shape, spatial orientation, location, or any other thing that results in a measure of image disparity.

Figure 10:
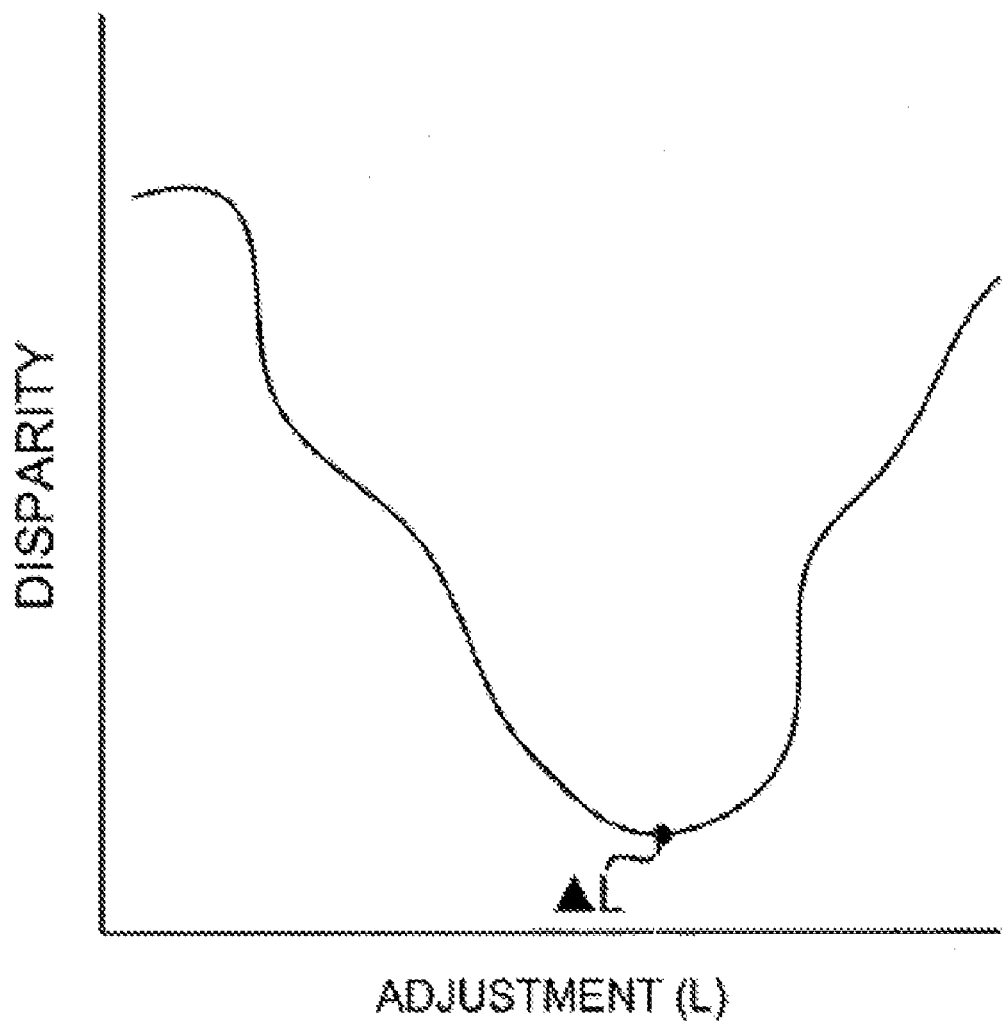
FIG. 10 is an example of a graph generated using disparity estimation techniques, according to an embodiment of the present invention.

Using any of the above disparity estimation techniques or a combination thereof, overlapping images 900L and 900R may be compared a multitude of times at different overlapping ranges (image adjustment), thereby generating a graph such as the one illustrated in FIG. 10 showing the difference in disparity associated with the amount of image adjustment L. L may be any numerical value for adjusting, or shifting images, such as: pixel, millimeter, centimeter, inch, etc. Additionally, L does not need to be an integer; it can be any real number.

Figure 9B:
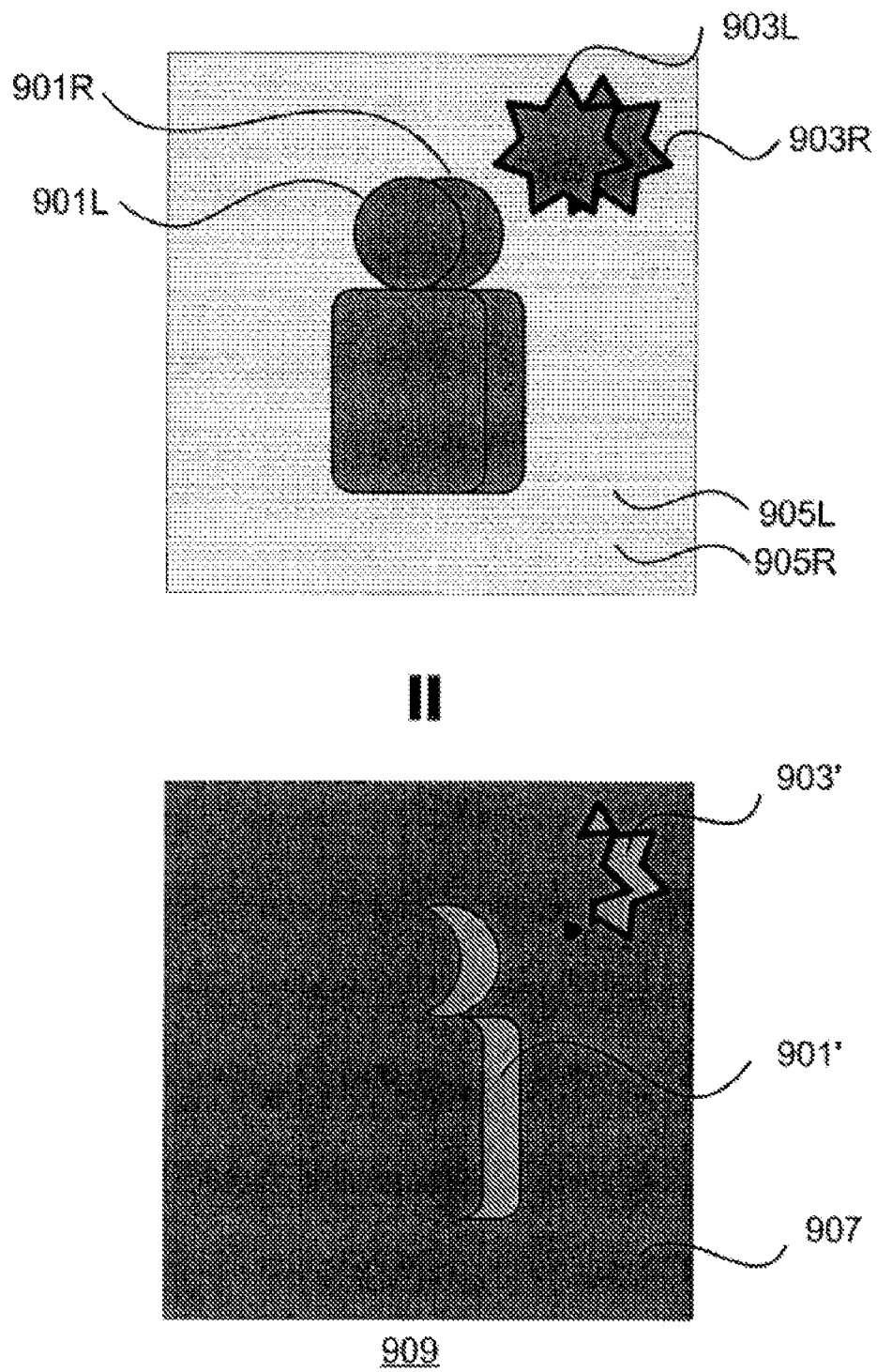
FIG. 9B illustrates an example of the disparity between objects of two combined images when one image is shifted a distance L, according to an embodiment of the present invention.

FIG. 9B illustrates the disparity between images 900L and 900R, where L=0. The disparity diagram 909 illustrates the pixels having the same or similar values as dark gray 907. The pixel values having a different value due to the disparity are illustrated as light gray areas 901' and 903'. Using one of the disparity estimation techniques, a value is assigned to represent the pixel difference at L=O.

Figure 9C:
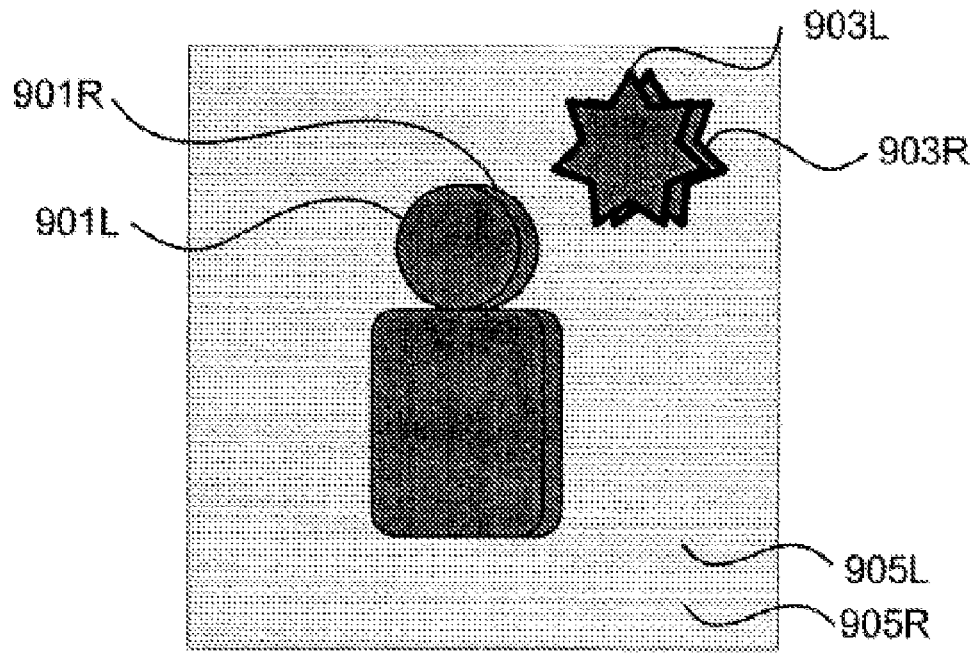
FIG. 9C illustrates another example of the disparity between objects of two combined images when one image is shifted a distance L, according to an embodiment of the present invention.
Figure 9C:
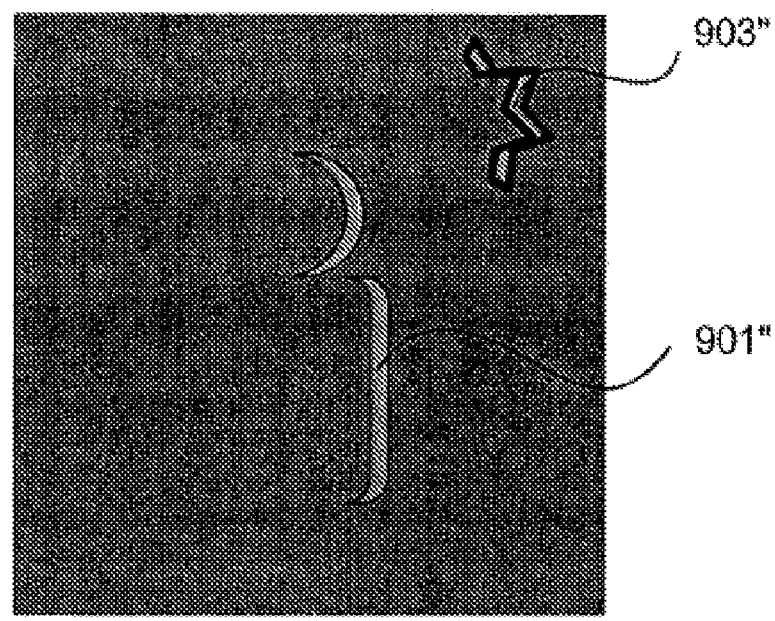

FIG. 9C illustrates images 900L, 900R combined where image 900L has been adjusted, or shifted, to the right with reference to image 900R an L distance equal to 1. As can be seen, the resulting pixel difference regions 901" and 903" illustrated in light gray are less than when compared to a disparity shown in FIG. 9B.

Figure 9D:
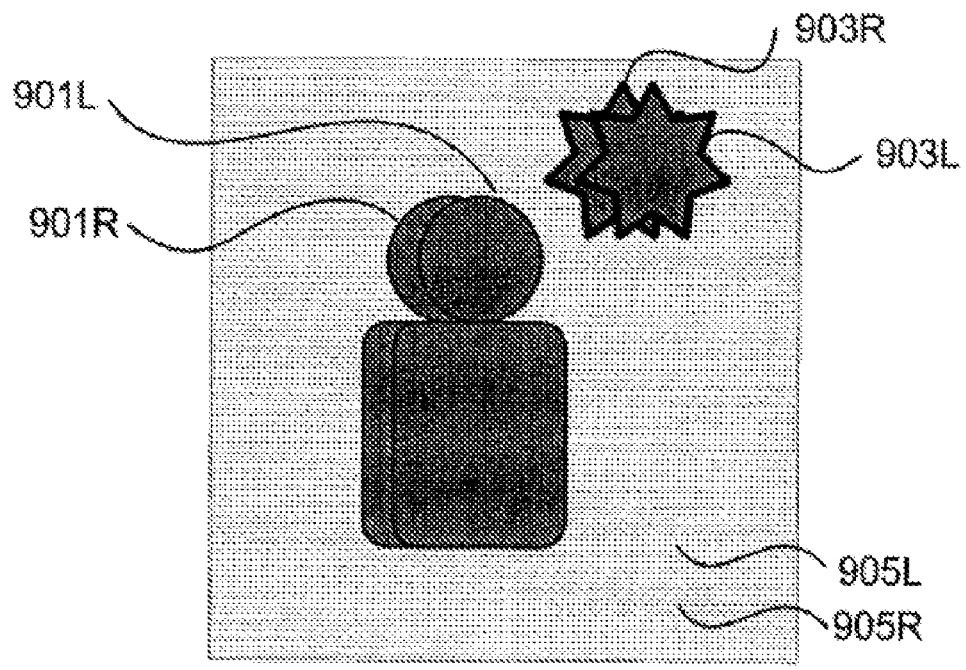
FIG. 9D illustrates a third example of the disparity between objects of two combined images when one image is shifted a distance L, according to an embodiment of the present invention.
Figure 9D:
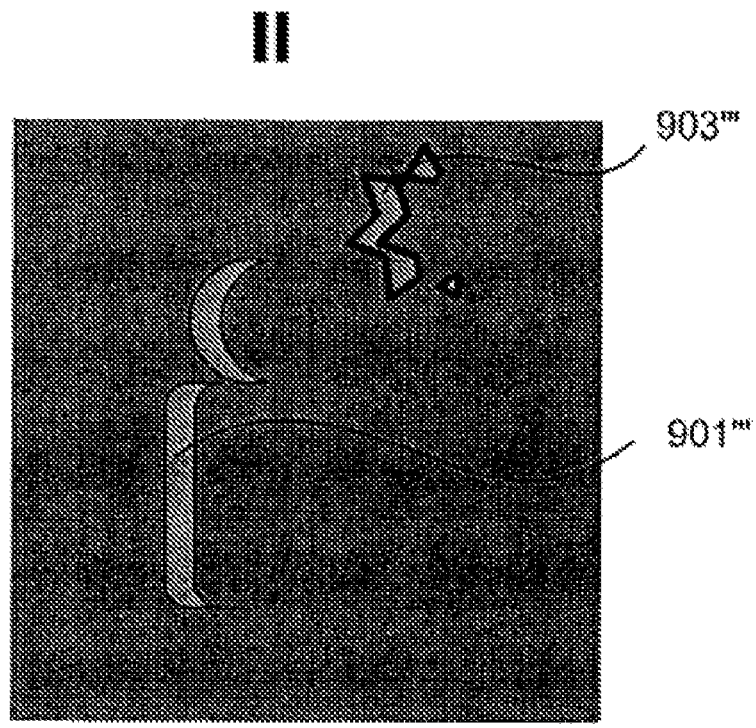

Likewise, FIG. 9D illustrates the disparity 901''' and 903''' in images 900L and 900R when the image 900L has been shifted to the right a length equal to 3.

Disparity estimation techniques can be run a multitude of times for different values of L, thereby generating a graph, such as the graph illustrated in FIG. 10, according to an embodiment of the present invention. Within the graph there will be a minimum disparity value for a specific adjustment $\Delta L$, which can be selected to use when combining overlapping images to generate a composite panoramic image.

In an embodiment, ΔL may be computed by shifting images with relationship to one another, shifting both images, or shifting one image with relation to the other a multitude of times and computing disparity using one of the above-described disparity estimation techniques for each value of L.

In an embodiment, disparity estimation/correction may be calculated for every frame, or adjusted based on need. For example, calculation and selection of ΔL may only be computed every other frame, every fifth frame, every other second, or any other selected re-computation frequency. For frames where ΔL is not computed, the then-existing value of ΔL may be used to adjust and combine the images.

Similarly, in an embodiment, instead of calculating disparity for every possible value of L, L is only computed a selected number of times and the minimum L from the computations is used as ΔL.

In still another embodiment, instead of computing the disparity for each entire image, only a portion of each combined image is sampled and computed. For example, to speed computation, every third pixel row of the combined images is compared for calculating disparity and finding ΔL, thereby reducing the overall computation time.

Additionally, images may be divided into multiple patches and disparity may be computed for different values of L for each overlapping patch and each overlapping patch adjusted according to its own selected value of ΔL.

Any technique, or combination thereof, may be used for determining ΔL.

In an alternative embodiment, disparity between combined images may be corrected by "stretching" one or both images to reduce the difference between overlapping images of objects. Similar to shifting images, determining how far to stretch the image or images may be performed using one, or a combination of the above-described disparity estimation techniques.

Figure 11A:
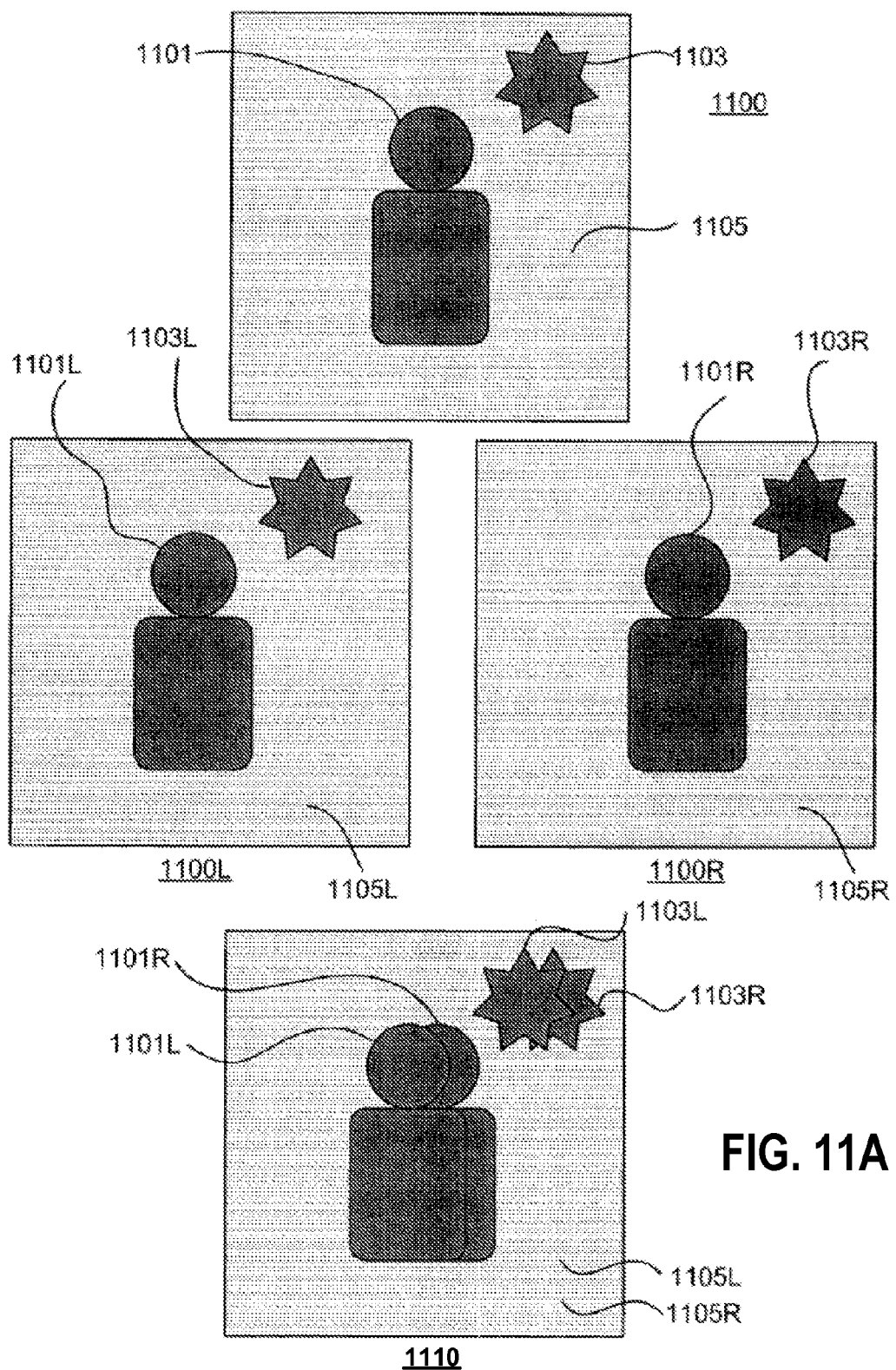
FIG. 11A illustrates an example of the disparity between objects of two combined images where each image is stretched a distance L, according to an embodiment of the present invention.

Referring to FIG. 11A, using any of the above disparity estimation techniques or a combination thereof, multiple images, such as images 1100L and 1100R may be compared a multitude of times at different stretch lengths L, thereby generating a graph similar to the one illustrated in FIG. 10 showing the disparity associated with the amount of stretching L. L may be any numerical value such as: pixel, millimeter, centimeter, etc. Additionally, L does not need to be an integer, it can be any real number.

Figure 11B:
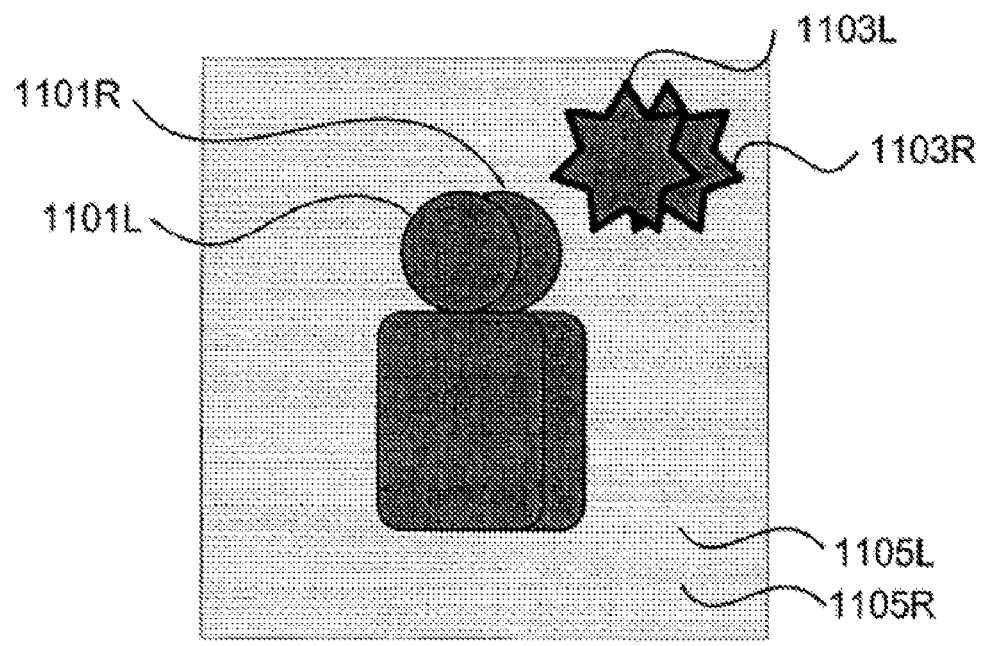
FIG. 11B illustrates a second example of the disparity between objects of two combined images where each image is stretched a distance L, according to an embodiment of the present invention.
Figure 11B:
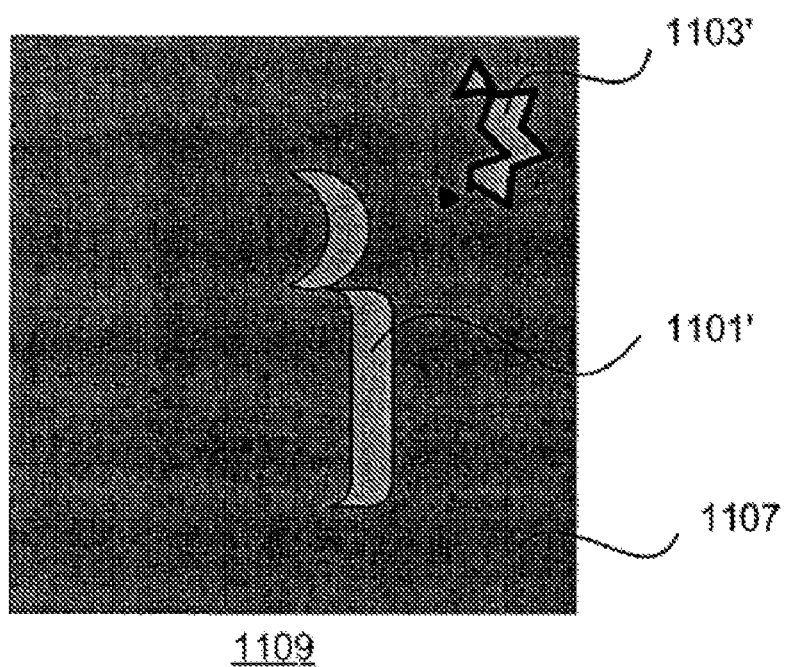

FIG. 11B illustrates the difference resulting from combining images 1100L and 1100R, without stretching (L=0). The difference diagram 1109 illustrates pixels having the same or similar values as dark gray 1107. The pixel values having a difference value due to a parallax problem are illustrated as light gray areas 1101' and 1103'.

Figure 11C:
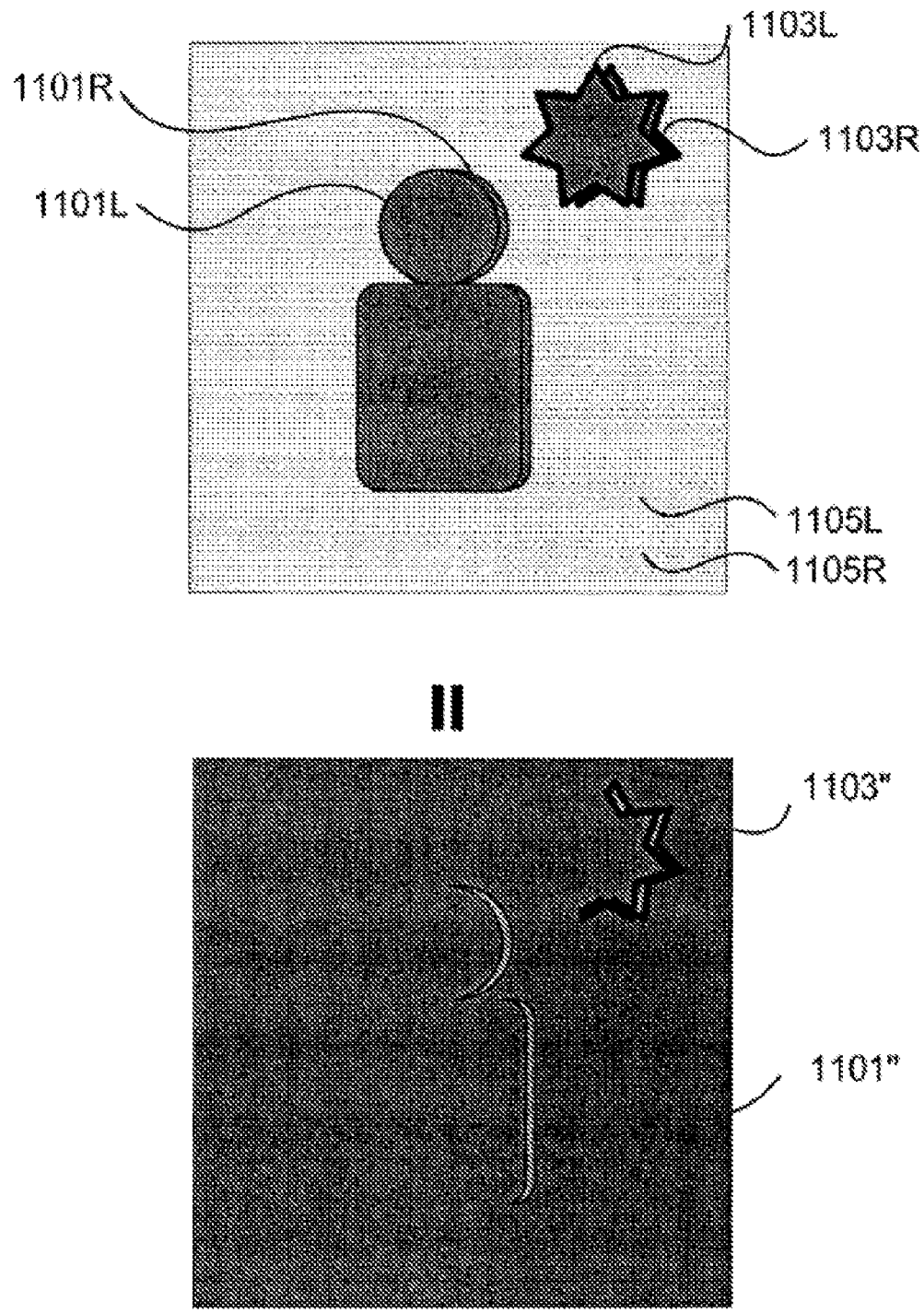
FIG. 11C illustrates a third example of the disparity between objects of two combined images where each image is stretched a distance L, according to an embodiment of the present invention.

FIG. 11C illustrates images 100L and 100R overlapped where image 1100L has been stretched to the right with reference to image 1100R an L distance equal to 1, and image 1100R has been stretched to the left with reference to image 1100L an L distance of 1.

In an embodiment, stretching an image is performed by keeping a portion of an image stationary, for example, one side of the image, while the remainder of the image is stretched. For example, referring again to FIG. 11A, in an embodiment, image 1100L is stretched to the right while the left side of the image remains stationary. Therefore the change in pixel values would be greater for the pixels on the right portion of the image in comparison to the pixels on the left portion of the image.

In an alternative embodiment, a point or particular portion of an image may be kept stationary and the remainder of the image stretched from there outward. This embodiment may be useful when one portion of the image is being focused on and/or is not overlapping any other camera view.

Additionally, when combining images using stretching techniques, one image may be stretched while the others remain unaltered, or all images may be stretched.

Figure 12:
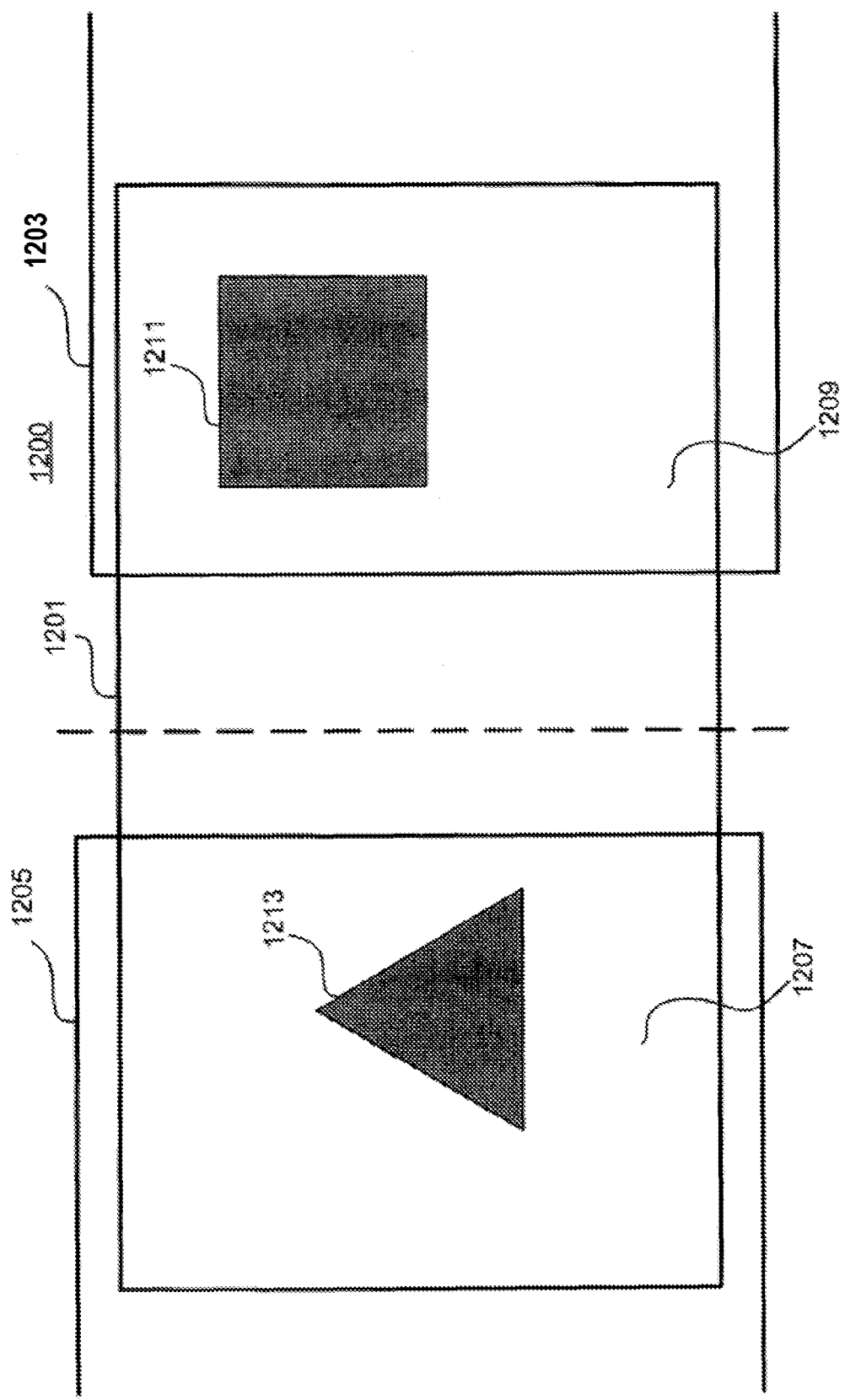
FIG. 12 illustrates an example of stretching an image in two locations, according to an embodiment of the present invention.

Stretching images, as described above, provides the ability to correct multiple occurrences of disparity in a single image. For example, referring to FIG. 12, scene 1200 containing objects 1211 and 1213 is viewed by three cameras of a multiple-camera viewing system, each camera having camera views 1201, 1203 and 1205, respectively. As can be seen the camera view 1201 has two overlaps 1207 and 1209, where more than one camera shares a common field of view. By selecting the center line of image 1201 as the stationary point, either side of image 1201 may be stretched, as described above, with respect to the center line to reduce disparity created in the common field of view 1209 of camera views 1201 and 1203, and the common field of view 1207 of camera views 1201 and 1205. In this embodiment, the different common fields of view 1209, 1207 of image 1201 may be stretched different amounts to compensate for parallax between the three cameras. Additionally, the common field of view 1209 from camera 1203 and the common field of view 1207 from camera 1205 may also be adjusted to help correct the disparity.

In an embodiment, disparity estimation/correction may be calculated for every frame, or adjusted based on need. For example, calculation and selection of ΔL may only be computed every other frame, every fifth frame, every other second, or any other selected re-computation frequency. For frames where ΔL is not computed, the then-existing value of ΔL may be used to adjust and combine overlapping images.

Similarly, in an embodiment, instead of calculating disparity for every possible value of L, L is only computed for a selected number of times and the minimum L from the computations is used as ΔL.

In still another embodiment, instead of computing the disparity for each entire image, only a portion of each combined image is sampled and computed. For example, to speed computation, every third pixel row of the combined images is compared for calculating disparity, thereby reducing the overall computation time. Alternatively, only the portion of each image which shares a common field of view is calculated.

Additionally, images may be divided into multiple patches and disparity may be computed for different values of L for each overlapping patch and each overlapping patch adjusted according to its own selected value of ΔL based on its disparity estimate.

Any technique, or combination thereof for calculating ΔL may be used.

In addition to correcting disparity between overlapping portions of images, disparity estimates have a number of additional applications. For example, disparity estimates may be used to estimate the location and number of objects or humans in the array's field of view. This is done by looking for local peaks in the smoothed disparity map (a smoothing of the grid (FIG. 10) of disparity estimates for each patch), using template matching or a similar technique. Once the positions are estimated, the virtual cameras can be "snapped to" the object locations ensuring they are always in the center of view.

If it is desired to find the range of moving objects such as humans, the above techniques can be used on the frame-by-frame pixel difference for more robust disparity estimates.

Disparity depends directly on the distance of the object in a patch from the cameras. This will not have high resolution due to the small camera baseline, and will often be noisy, but still is able to detect, for example, the position of humans sitting around a conference table. Patches may be small, on the order of 10-50 pixels, and can be overlapped for greater spatial detail, as there will be only one disparity estimate per patch. The result is a grid of disparity estimates and their associated confidence scores.

Another application is to ensure that camera seams do not intersect objects. Because the individual camera views may overlap by several patches, the system can be configured to blend only those patches that do not have significant disparity estimates, that is, contain only background images instead of objects.

Yet another application is to segment the panoramic images into foreground and background images. Once again, this task is simplified by the fact that the camera array is fixed with respect to the background. Any image motion is thereby due to objects and objects alone. Patches with no significant motion or disparity are background images. As long as foreground objects move enough to reveal the background, the background can be robustly extracted. The difference between any given image and the background image will be solely due to foreground objects. These images can then be extracted and used for other applications; for example, there is no need to retransmit the unchanging background. Significant bandwidth savings can be gained by only transmitting the changing object images (as recognized in the MPEG-4 video standard).

Cross-Fading

Figure 13:
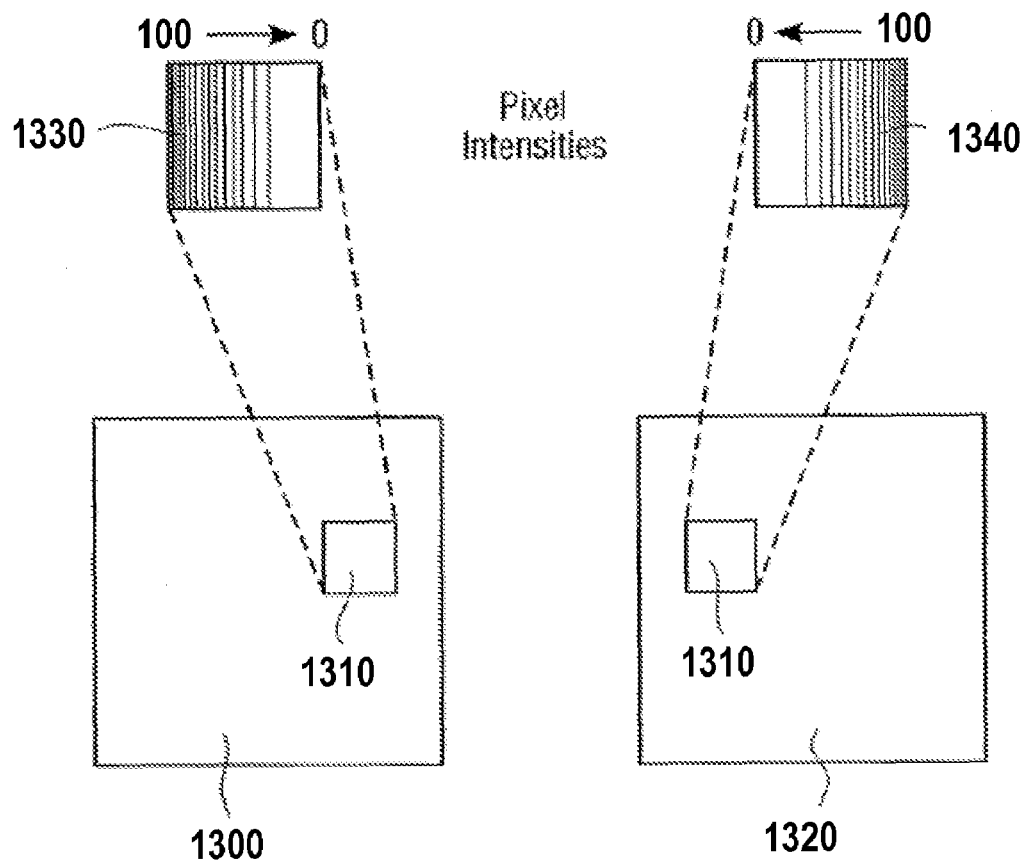
FIG. 13 is an illustration of a cross-fading technique according to an embodiment of the present invention.

Once the source polygons have been warped to a common coordinate system and parallax corrected for overlapping images, a "cross-fade" can be utilized to combine them, as illustrated in FIG. 13.

In this process, two or more images are obtained from different cameras. For example, cameras 1300 and 1320 of FIG. 13 each have imaged a same square 1310. Each image is faded by reducing the pixel intensities across the patch (imaged square) in a linear fashion. For example, the patch from the left camera 1300 is faded so that pixel intensities fade to zero at the rightmost edge of the patch, while the leftmost are unchanged (see expanded patch 1330). Conversely, the right camera patch is faded such that the leftmost pixels go to zero (see expanded patch 1340). When the pixel intensities of right and left patches are added, the result is a patch image that smoothly blends the two images. This technique further reduces artifacts due to camera separation and image intensity differences.

Patches for fading may be of any size or shape within the confines of a camera view. Therefore any geometric shape or outline of an object or other selected area within two or more camera views may be selected for fading.

The number and size of patches can be adjusted as necessary to give a good mapping and reduce the appearance of "seams" in the composite image. "Seams" can be put at arbitrary locations by changing the interpolation function, for example, by using a piecewise linear interpolation function. This is especially useful when face locations are known, because the image combination can be biased such that seams do not cut across faces.

Alternatively, individual corresponding pixels in overlapping regions, after warping and matching those images, may be summed and averaged in some manner and then faded or blurred at edges or throughout the overlapping regions. As will be appreciated by those skilled in the art, many procedures, including fading, blurring, or averaging may be implemented to smooth transitions between the warped abutting and/or combined images.

Figure 14:
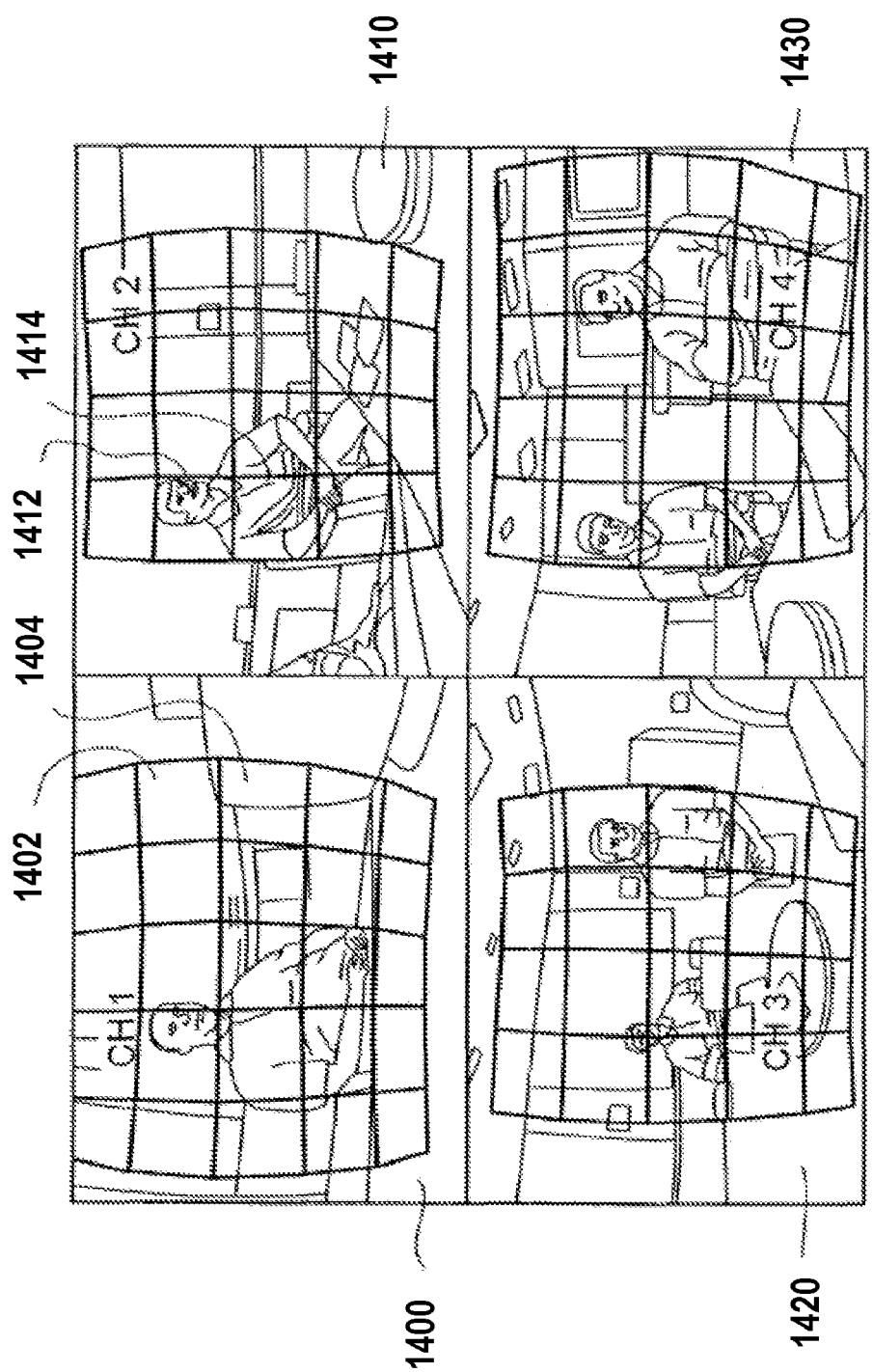
FIG. 14 is an illustration of multiple camera images and quadrilateral regions to be warped from each image, according to an embodiment of the present invention.
Figure 15:
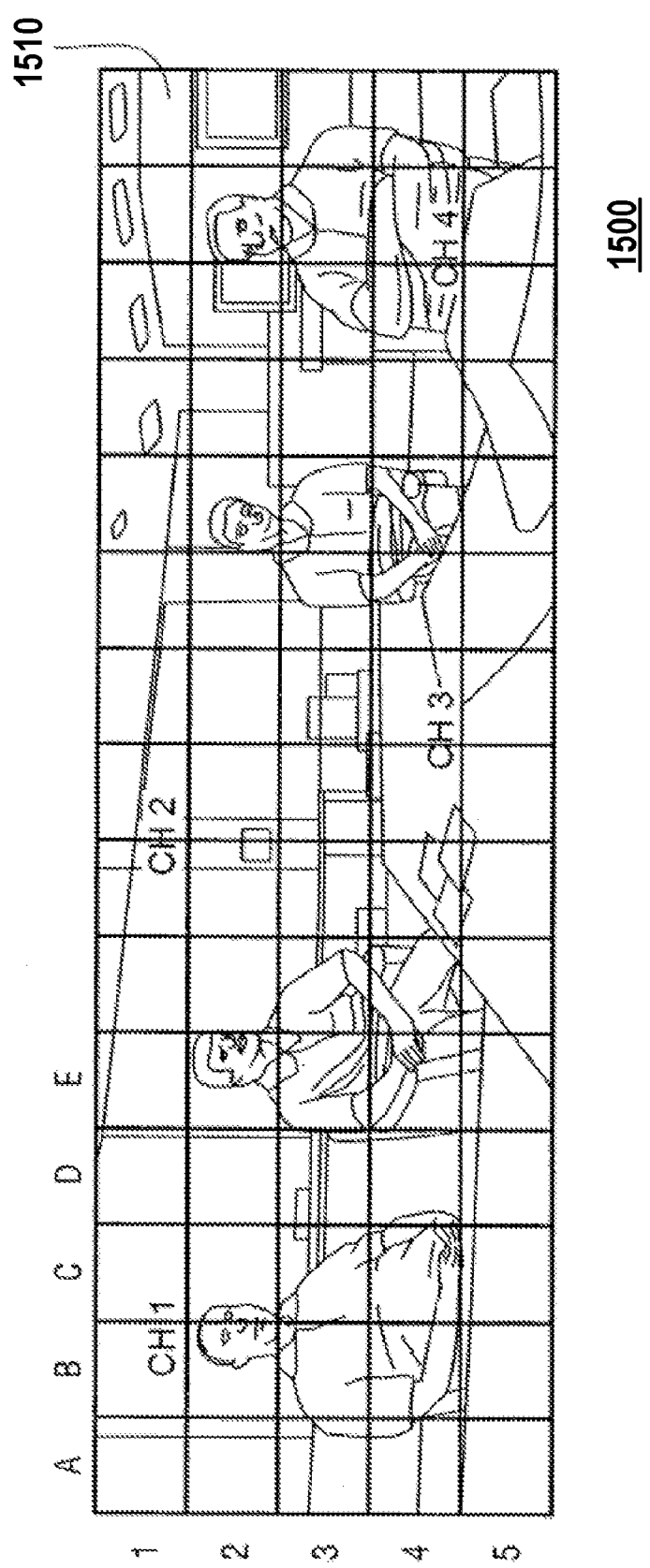
FIG. 15 is a composite panoramic image constructed from the patches (quadrilateral regions) illustrated in FIG. 14 according to an embodiment of the present invention.

FIGS. 14 and 15 show how multiple images can be integrated into a high-resolution composite. FIG. 14 illustrates images taken from cameras 1400 (CH1), 1410 (CH2), 1420 (CH3), and 1430 (CH4). Each of the images includes a set of quadrilateral grids to be warped into a common coordinate system, according to an embodiment of the present invention.

FIG. 15 shows a composite 1500 of the images of FIG. 14 after warping, disparity correction, cross-fading and combined into a common coordinate system, according to an embodiment of the present invention. FIG. 15 includes a grid 1510 corresponding to the common coordinate system, and is provided for reference. Note how the images are not only combined, but distortions and parallax are corrected. For example, the curved edges of the leftmost wall (along tiles A1 . . . A5) are straight in the composite and there is no ghosting effect from combined images.

Also note the effects of cross-fading to produce a seamless image. Quadrilateral regions 1402 and 1412, and 1404 and 1414 (FIG. 14) of the camera images are combined to produce grid squares E2 and E3 of the composite. Quadrilateral regions 1402 and 1404 of CH1 are darker than corresponding regions 1442 and 1414 of CH2, as is common in similar views from different cameras. However, when combined the rightmost portions of grid squares E2 and E3 are light (as in quadrilateral regions 1412 and 1414), while the leftmost regions of grid squares (E2 and E3) are dark (as in quadrilateral regions 1402 and 1404), and no seams are present.

Figure 16:
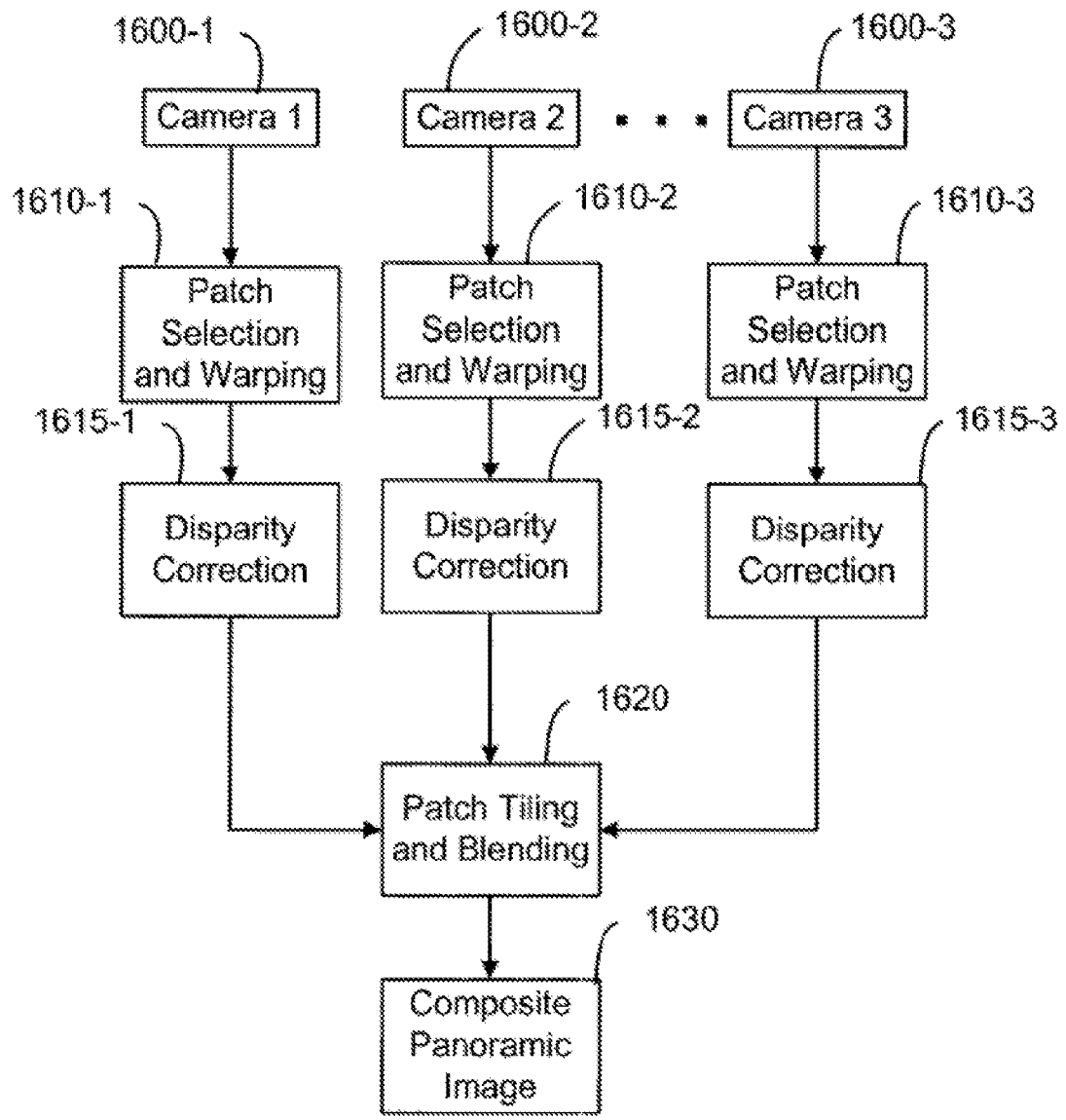
FIG. 16 is a flow diagram illustrating an image composition procedure for each frame in a video sequence, according to an embodiment of the present invention.

As one who is skilled in the art would appreciate, FIG. 16 illustrates logic steps for performing specific functions. In alternative embodiments, more or fewer logic steps may be used. In an embodiment of the present invention, a logic step may represent a software program, a software object, a software function, a software subroutine, a software method, a software instance, a code fragment, a hardware operation or user operation, singly or in combination.

FIG. 16 is a flow diagram illustrating the steps for compositing each video frame. In this flow, three cameras (1600-1, 1600-2, and 1600-3) each provide one image to be combined as part of a composite panoramic image. At steps 1610-1, 1610-2, and 1610-3, each of the images are processed by selecting patches (quadrilateral regions) and warped into a space for fitting into a common coordinate system. At steps 1615-1, 1615-2, and 1615-3, parallax from overlapping quadrilateral regions (patches) is corrected using image disparity estimation techniques, and at step 1620, the patches are cross-faded to eliminate edges and seams, and placed in tiles (the common coordinate system, for example). Upon completion, the composite panoramic image is available for display, selection, storage or other processes (step 1630). Note that this procedure, including all data transfer and warping, using currently available processing speeds, can be performed at video rates of 10-30 frames per second.

Automatic Control of Virtual Cameras

Mechanically-steered cameras are constrained by the imitations of the mechanical systems that orient them. A particular advantage of virtual cameras is that they can be panned/zoomed virtually instantaneously, with none of the speed limitations due to moving a physical camera and/or lens. In addition, moving cameras can be distracting, especially when directly in the subject's field of view, like the conference-table camera shown in FIG. 3.

In this system, we can select one or more normal-resolution "virtual camera" images from the panoramic image.

Mechanical cameras are constrained by the fact that they can be pointed in only one direction. A camera array suffers no such limitation; an unlimited number of images at different pans and zooms can be extracted from the panoramic image. Information from the entire composite image can be used to automatically select the best sub-images using motion analysis, audio source location, and/or face tracking. To reduce the computation load, parts of the panoramic image not used to compose the virtual images could be analyzed at a slower frame rate, resolution, or in grayscale.

A useful application of camera arrays is as a wide-field motion sensor. In this case, a camera array is fixed at a known location in a room. Areas of the room will correspond to fixed locations in the image plane of one or more cameras. Thus using a lookup table or similar method, detecting motion in a particular region of a video image can be used to find the corresponding spatial location of the motion. This is enough information to point another camera in the appropriate direction, for example. Multiple cameras or arrays can be used to eliminate range ambiguity by placing their field of view at right angles, for example, at different room corners.

Another useful system consists of conventional steerable cameras and a camera-array motion sensor. Motion in a particular location would set appropriate camera pan/zoom parameters such that a subject is captured. For example, in FIG. 4C, motion above the podium would signal the appropriate camera to move to a location preset to capture a podium speaker. This mode of operation is computationally cheap, and less expensive black-and-white ("B/W") cameras could be used in the camera array, as the resultant image need not be shown. This could have significant savings in processing as well, as three B/W cameras could be multiplexed on one RGB video signal.

Camera Control Using Video Analysis

In one embodiment, a motion analysis serves to control a virtual camera; that is, to select the portion of the panoramic image that contains the moving object. Motion is determined by computing the frame-to-frame pixel differences of the panoramic image. This is thresholded at a moderate value to remove noise, and the center of gravity (first spatial moment) of the resulting motion image is used to update the center of the virtual image. The new virtual image location is computed as the weighted average of the old location and the motion center of gravity. The weight can be adjusted to change the "inertia," that is, the speed at which the virtual camera changes location. Giving the previous location a large weight smoothes jitter from the motion estimate, but slows the overall panning speed. A small weight means the virtual camera responds quickly to changes in the motion location, but may jitter randomly due to small-scale object motion.

Tracking can be further improved by adding a hysteresis value such that the virtual camera is changed only when the new location estimate differs from the previous one by more than a certain amount. The motion centroid is averaged across both a short and a long time span. If the short-time average exceeds the long-time average by a preset amount, the camera view is changed to that location. This accounts for "false alarm" events from both stable sources of image motion (the second hand of a clock or fluorescent light flicker) as well as short-term motion events (such as a sneeze or dropped pencil). This smoothes jitter, but constant object motion results in a series of jumps in the virtual camera position, as the hysteresis threshold is exceeded.

Other enhancements to the motion detection algorithm include spatial and temporal filtering, for example, emphasizing hand gestures at the expense of nodding or shifting. In operation, the virtual camera is initially zoomed out or put in a neutral mode, which typically includes everything in the camera's view. If a radial array is used, as in FIG. 3, the composite image will have a narrow aspect ratio, that is, will be wider than it is high. In this case, the neutral view can be "letter boxed" into a normal-aspect frame by reducing it in size and padding it with black or another color.

Alternatively, the neutral position could be a "Brady Bunch" view where the large image is broken into units to tile the normal-aspect frame. The output of a face tracker ensures that all participants are in view, and that the image breaks do not happen across a participant's face.

If motion is detected from more than one region, several heuristics can be used. The simplest is to just choose the region with the largest motion signal and proceed as before. Another option might be to zoom back the camera view so that all motion sources are in view. In the case of conflicting or zero motion information, the camera can be changed back to the default neutral view.

Another useful heuristic is to discourage overlong scenes of the same location, which are visually uninteresting. Once the virtual camera location has been significantly changed, a timer is started. As the timer value increases, the motion change threshold is decreased. This can be done in such a way that the mean or the statistical distribution of shot lengths match some predetermined or experimentally determined parameters. Another camera change resets the timer. The net effect is to encourage human-like camera operation. For example, if the camera has been focused on a particular speaker for some time, it is likely that the camera would cut away to capture a listener nodding in agreement, which adds to the realism and interest of the video, and mimics the performance of a human operator.

All the above techniques can be combined with the object locations estimated from the disparity map.

Audio Control of Virtual Cameras

Using microphone arrays to determine the location and direction of acoustic sources is known. These typically use complicated and computationally intensive beamforming algorithms. However, a more straightforward approach may be utilized for determining a direction of a speaker at a table, or from which side of a room (presenter or audience) speech is coming from. This information, perhaps combined with video cues, a camera can be automatically steered to capture the speaker or speakers (using the methods of the previous sections).

Figure 17:
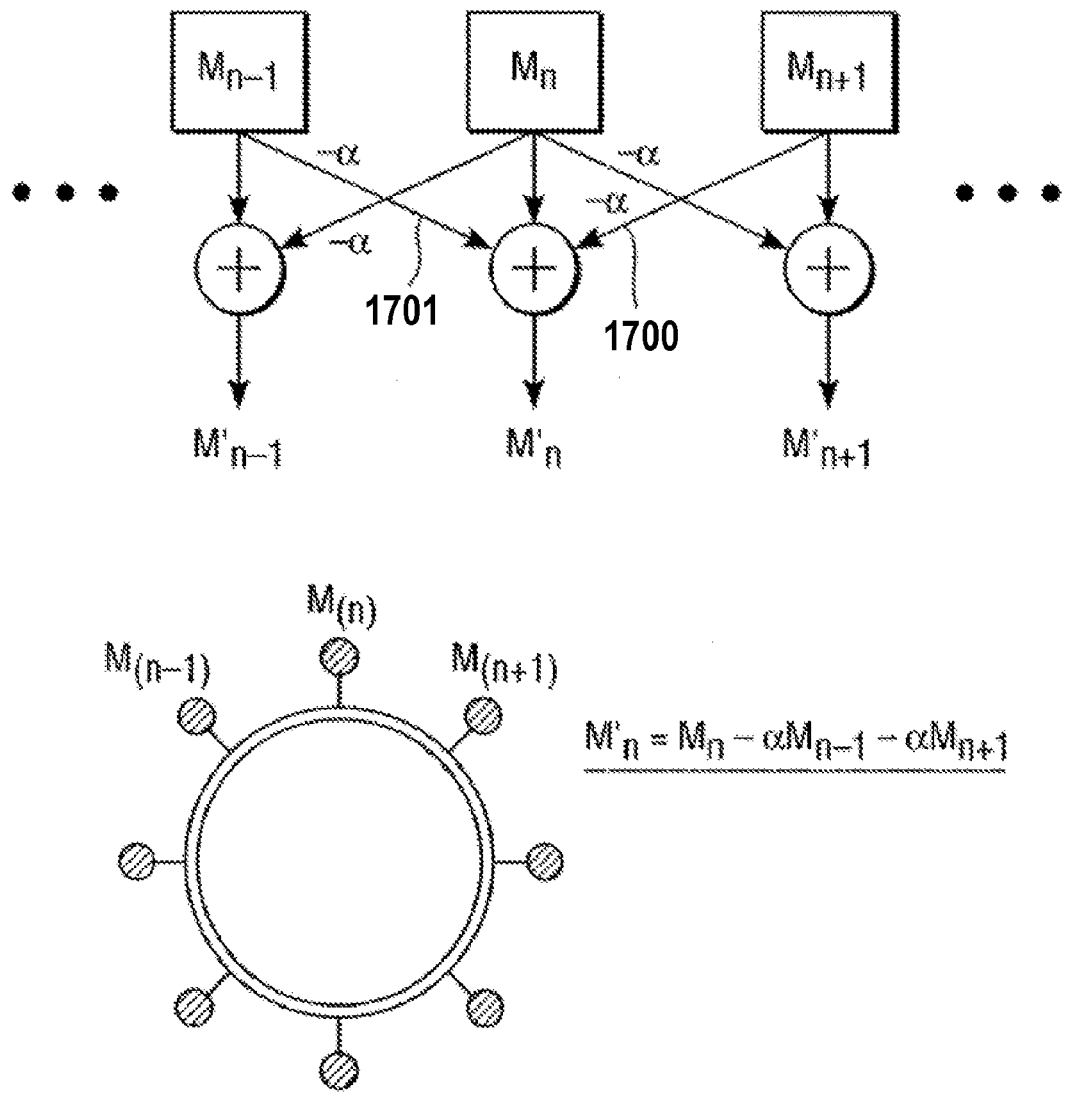
FIG. 17 is a diagram illustrating a radial microphone array, according to an embodiment of the present invention.

While conventional beamforming relies on phase differences to estimate the direction and distance of an acoustic source, an embodiment of the present invention obtains a good estimate using the amplitude of an acoustic signal. The system presented here uses an array of directional microphones aligned around a circle as shown in FIG. 17. Such an array is placed in the center of a meeting table or conference room. If the microphones are sufficiently directional, then the microphone with the highest average magnitude should indicate the rough direction of an acoustic source.

Adverse effects, such as acoustic reflections (not least off walls and tables), and the imperfect directionality of real microphones (most cardioid microphones have a substantial response at 180 degrees to their axis) are minimized according to an embodiment of the present invention.

In one embodiment, the present invention utilizes a pre-filtering of the acoustic signal to frequencies of interest (e.g. the speech region) helps to reject out-of-band noise like ventilation hum or computer fan noise.

In addition, lateral inhibition is utilized to enhance microphone directionality. In one embodiment, lateral inhibition is done by subtracting a fraction of the average signal magnitude from each neighboring microphone. The time-averaged magnitude from each microphone is denoted |M| as illustrated in FIG. 17. A small fraction $\alpha<1$ ($\alpha$ 1700 and $\alpha$ 1701 subtracted from Mn, for example) is subtracted from each of the neighbor microphones. This sharpens the spatial resolution from each microphone. The neighbor dependence can be increased beyond nearest neighbors if necessary. If the subtraction is done in the amplitude or energy domain, then problems due to phase cancellation and reinforcement are avoided altogether. The result is to sharpen the directionality of each microphone.

In one embodiment, the system is normalized for ambient conditions by subtracting the ambient energy incident on each microphone due to constant sources such as ventilation. When the system is running, each microphone will generate a real-time estimate of the acoustic energy in its "field of view." It might be possible to get higher angular resolution than the number of microphones by interpolation.

A more robust system estimates the location of an acoustic source by finding peaks or corresponding features in the acoustic signals from each microphone. Because of the finite speed of sound, the acoustic signal will arrive first at the microphone closest to the source. Given the time delay between peaks, the first-arriving peak will correspond to the closest microphone. Given delay estimates to microphones at known locations, geometrical constraints can be used to find the angular direction of the source.

In a complex environment with many reflections, the statistics of reflections may be learned from training data to characterize the angular location of the source. Combining this with the amplitude cues above will result in an even more robust audio location estimate.

A system with particular application to teleconferencing consists of one or more desk microphones on flexible cords. In use, microphones are placed in front of each conference participant. Each microphone is equipped with a controllable beacon of visible or invisible IR light. The beacon is set to flash at a rate comparable to ½ the video frame rate. Thus there will be frames where the beacon is illuminated in close temporal proximity to frames where the beacon is dark. Subtracting these frames will leave a bright spot corresponding to the beacon; all other image features will cancel out. From this method the location of the microphones in the panoramic image can be determined. Audio energy detected at each particular microphone can give a clue to shift the virtual image to that microphone.

Camera Control Using Audio

Given the angular direction and the magnitude signals from the various microphones, cameras can be controlled using algorithms similar to those described for motion above according to an embodiment of the present invention. Short-term and long-term averages can accommodate fixed noise sources like computer fans. A number of heuristics are used to integrate face and/or motion detection with the audio source location. The audio direction is used as an initial estimate of speaker location to start the face tracking system. Additionally, both face tracking and audio source location can be used in concert. Thus an object must both be recognized as a face and be an audio source before the camera is steered towards it. This is particularly useful for the automatic teleconferencing system that aims to display the image of the person speaking.

Stereo Ranging

Since the present invention utilizes multiple cameras, stereo ranging of objects in the scene to be imaged may be performed. Conference room walls would be considered at a maximum range, but any object closer to the camera would be considered to be more likely subjects for moving focus of a virtual view of the image. If stereo ranging determines an object is closer than the conference room walls, and it is moving (motion detection via video analysis, for example) it is more likely to be a subject. If audio detection is also added, the object can be determined with even a higher degree of certainty to be a subject for zooming in. In an embodiment, the present invention utilizes an embodiment utilizing a combination of all analysis functions, audio, video motion detection, and stereo ranging to determine a likely subject for camera zooming.

Data Manipulation and Compression

Multiple video cameras require techniques to cope with the sheer amount of generated video data. However, it is quite possible to composite multiple video streams in real time on a common CPU, and this should scale with increasing processor speed and parallelization. It is possible to stream each camera to a plurality of analog or digital recording devices, such that all camera views are recorded in real time. The recorded streams can then be composited using the same methods at a later time. Another approach is to store the composited high-resolution video image in a format that can support it.

Many common video formats such as MPEG support arbitrarily large frame sizes. Recording a full-resolution image has many advantages over prior art: first of all multiple views can still be synthesized from the high-resolution image, which may support varied uses of the source material. For example, in a videotaped lecture, one student might prefer slide images while a hearing-impaired but lip-reading student might prefer the lecturer's image. Recording a full-resolution image also allows better automatic control. Because any real-time camera control algorithm can't look ahead to future events, it is possible to get better control using a lag of several seconds to a minute. Thus switching to a different audio or motion source could be done instantaneously rather than waiting for the short-term average to reach a threshold.

Existing standards like MPEG already support frames of arbitrary resolution provided they are rectangular. It is possible to composite images using MPEG macroblocks rather than in the pixel domain for potentially substantial savings in both storage and computation. The multi-stream approach has the advantage that only the streams needed for a particular application need be considered.

For example, when synthesizing a virtual camera from a circular array ("B" of FIG. 3, for example), a likely application would only require, at most, two streams of video to be considered at any one time. When combined with the fast warping techniques associated with the present invention, such processing is well within the capacity of a desktop PC.

A reverse embodiment is also envisioned: extracting normal-resolution video from a super-resolution MPEG stream is merely a matter of selecting and decoding the appropriate macroblocks. Given bandwidth constraints, a panoramic video image may be efficiently transmitted by sending only those regions that have changed significantly. This technique is commonly used in low-bandwidth video formats such as H.261. A novel adaptation of this method is to only store or transmit image regions corresponding to moving faces or a significant audio source such as a speaker.

Automatic Camera Registration

In order to merge overlapping images from different cameras, they must be registered such that lens and imaging distortion can be identified and corrected. This is particularly important with embodiments of the present invention that utilize the matrix coefficients, as they are premised on registered cameras. Generally, it is envisioned that cameras in the arrays will be fixed with respect to one another, and that registration will be performed at time of manufacture.

The present invention includes registering array cameras that are fixed with respect to each other. Registering cameras involves finding points that correspond in each image. This can be done manually, by observing two views of the same scene and determining which pixels in each image correspond to the same point in the image plane. Because cameras are fixed with respect to each other, this need only be done once and may be performed automatically. Manual registration involves locating registration points manually, say by pointing the camera array at a structured image such as a grid, and locating grid intersection points on corresponding images. Using machine-vision techniques, this could be done automatically.

Figure 18:
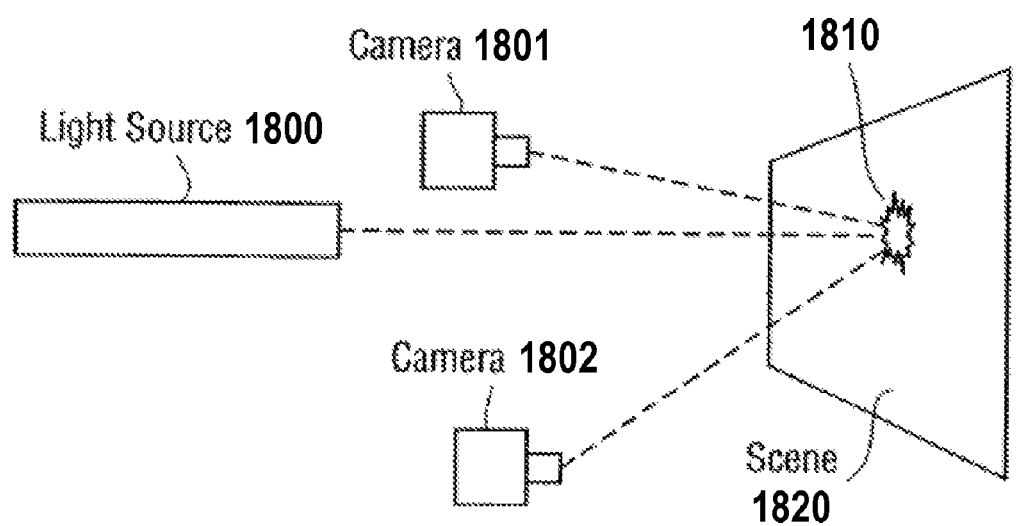
FIG. 18 is a diagram of an automatic camera calibration system using a light source to find registration points, according to an embodiment of the present invention.

In one embodiment, registration is performed using a "structured light" method (e.g. a visible or IR laser spot swept over the camera array's field of view, as shown in FIG. 18). In this example, a semiconductor laser 1800 (other types of light sources may be utilized, a focused infrared beam, for example) is arranged to project a bright spot 1810 of visible red or infrared light on a scene 1820 to be imaged. An image from each camera (camera 1801 and 1802, in this example) is then analyzed to detect the spot location, which then serves as a registration point for all cameras that have it in view.

Because the spot 1810 is orders of magnitude brighter than any projected image, detection can be performed by thresholding the red channel of the color image (other detection methods are also envisioned, color differences, or analyzing a combination of shape and brightness, for example). The spot 1810 also needs to be moved to find multiple registration points. This could be done using a rotating mirror or other optical apparatus, using multiple lasers (which are inexpensive), or by affixing a laser to a mechanically steered camera as described previously.

Another version of this system uses bright IR or visible LEDs affixed to a rigid substrate. Lighting the LEDs in succession provides registration points. The substrate can be moved to the approximate imaging error so that parallax is minimized at those points.

Figure 19:
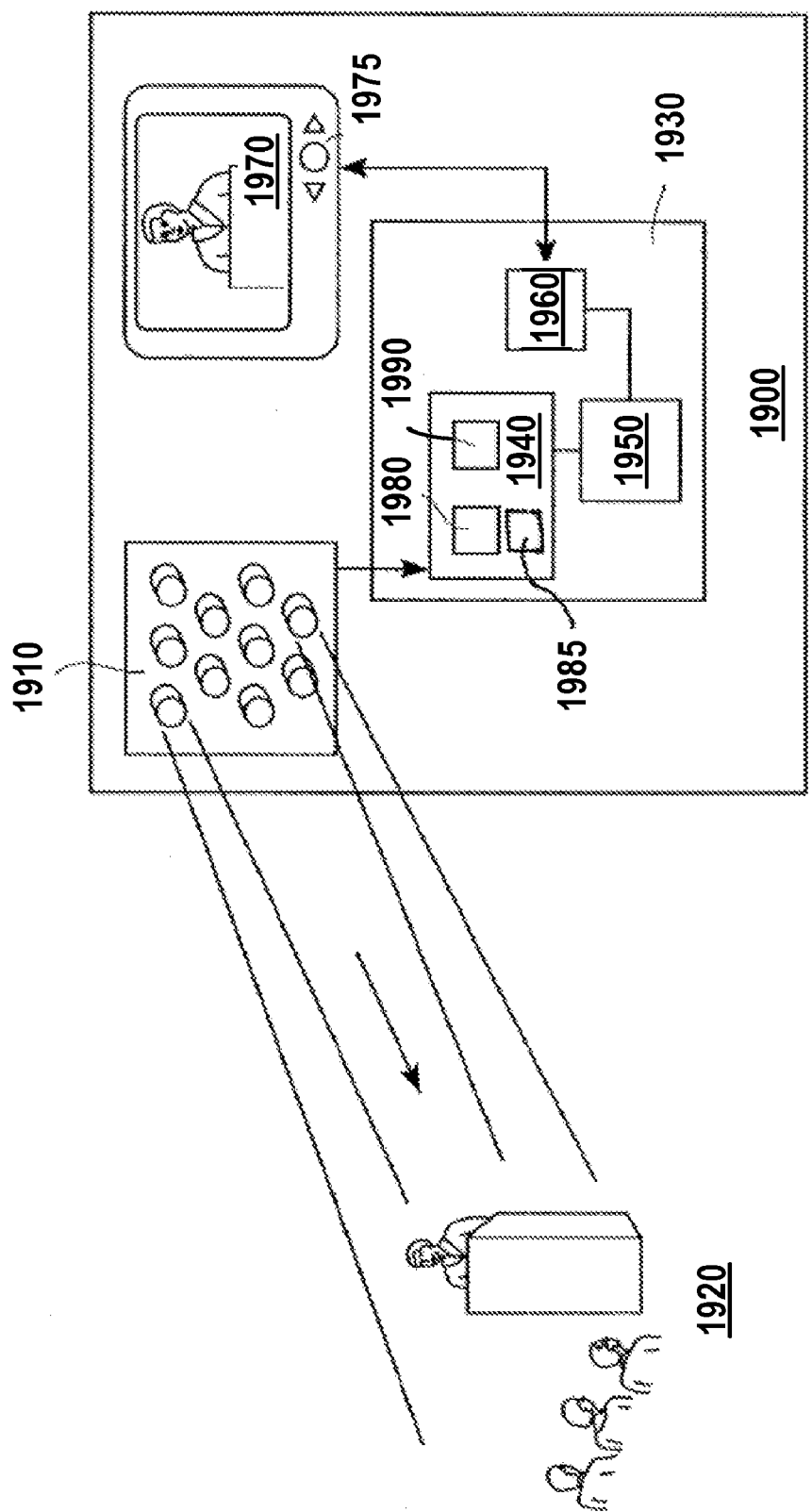
FIG. 19 is a block diagram of an embodiment of the present invention having a selection device for selecting a view from a combined image.

One embodiment of the present invention is illustrated in the block diagram of FIG. 19. FIG. 19 illustrates a video system 1900 having a camera array 1910, a combining device 1930, a view selection device 1960, and an output mechanism 1970. The camera array 1910 is trained on a conference lecture 1920. Images from the camera array 1910 are combined in a combining device 1940 using any of the above processes (warping via a warping mechanism 1980, correcting parallax via a parallax correction mechanism 1985, and cross fading via a fading device 1990, for example). In this embodiment, the combined image is stored in a memory 1950, and the view selection device 1960 selects a part of the combined image for display on output mechanism 1970. The view selection device may make its selection based on inputs from a user input via input mechanism 1975 (a trackball, mouse or keyboard, for example), or it may automatically select a view based on the above discussed audio inputs, stereoscopic ranging, or video motion analysis.

The present invention may be conveniently implemented using a conventional general purpose or a specialized digital computer or microprocessor programmed according to the teachings of embodiments of the present invention.

An embodiment of the present invention includes a computer program product which is a storage medium (media) having instructions stored thereon/in which can be used to program a computer to perform any of the processes of an embodiment of the present invention. The storage medium may include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), an embodiment of the present invention may include software for controlling both the hardware of the general purpose/specialized computer or microprocessor, and for enabling the computer or microprocessor to interact with a human user or other mechanism. Such software may include, but is not limited to, device drivers, operating systems, and user applications. Additionally, such computer readable media may further include software for performing an embodiment of the present invention, as described above.

Included in the programming (software) of the general/specialized computer or microprocessor may be software modules for implementing the teachings of the present invention, including, but not limited to, inserting anchors into work artifacts, communication with application programming interfaces of various applications, initiating communications and communication clients, maintaining relative positions of conversation or communication clients to corresponding anchors in a work artifact, retrieving and logging conversations, requesting and handling communications requests, managing connections, initiating applications and downloading artifacts, and the display, storage, or communication of results according to embodiments of the present invention.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for combining frames of video from a plurality of cameras arranged in a camera array, comprising the steps of:

obtaining a first frame from a first camera, and a second frame from a second camera, wherein at least a portion of said first frame and said second frame include a common field of view;

stretching said at least a portion of said first frame to reduce an image disparity between said common field of view of said first frame and said second frame;

wherein the step of stretching further comprises the steps of:

determining a plurality of disparity differences between the at least a portion of said first frame and at least a portion of said second frame, each disparity difference corresponding to a distance of stretching of said first frame and said second frame;

selecting a distance corresponding to a lowest disparity difference in said plurality of disparity differences as a stretching distance;

stretching the at least a portion of said first frame and said second frame such that a total stretching of said first and second frames approximately equals said stretching distance; and combining said common field of view of said first frame and said second frame subsequent to said step of stretching; and wherein the method steps are done by at least one processor.

2. The method of claim 1, wherein said step of stretching the at least a portion of said first frame includes stretching the at least a portion of said first frame a first distance, wherein said first distance is a distance where the image disparity is reduced.

3. The method of claim 1, further including the step of:

stretching said second frame to reduce said image disparity between said common field of view of said first frame and said second frame.

4. The method of claim 3, wherein said step of stretching said second frame includes stretching said second frame a second distance.

5. The method of claim 1 further including the step of:

warping said first frame and said second frame into a common coordinate system of a composite frame subsequent to said step of obtaining.

6. A system for the combination of frames of video from a plurality of cameras arranged in a camera array, comprising:

a first frame from a first camera;

a second frame from a second camera, wherein at least a portion of said first frame and said second frame include a common field of view;

the common field of view, such that the at least a portion of said first frame is stretched to reduce an image disparity between said common field of view of said first frame and said second frame;

a plurality of disparity differences determined between the at least a portion of said first frame and the at least a portion of said second frame, each disparity difference corresponding to a distance of stretching of said first frame and said second frame;

a stretching distance corresponding to a lowest disparity difference in said plurality of disparity differences;

a stretching of the at least a portion of said first frame and a stretching of the at least a portion of said second frame such that a total stretching of said first and second frames approximately equals said stretching distance; and a combination of said common field of view of said first frame and said second frame subsequent to said portion being stretched.

7. The system of claim 6, wherein said at least a portion of said first frame is stretched a first distance, wherein said first distance is a distance where the image disparity is reduced.

8. The system of claim 6, wherein the at least a portion of said second frame is stretched to reduce said image disparity between said common field of view of said first frame and said second frame.

9. The system of claim 8, wherein said at least a portion of said second frame is stretched a second distance.

10. The system of claim 6 further comprising:

a warping of said first frame and said second frame are warped into a common coordinate system of a composite frame.

11. A machine-readable storage medium having executable instructions stored thereon that performs the method of combining frames of video from a plurality of cameras arranged in a camera array, comprising the steps of:

obtaining a first frame from a first camera, and a second frame from a second camera, wherein at least a portion of said first frame and said second frame include a common field of view;

stretching the at least a portion of said first frame to reduce an image disparity between said common field of view of said first frame and said second frame;

wherein the step of stretching further comprises the steps of:

determining a plurality of disparity differences between the at least a portion of said first frame and the at least a portion of said second frame, each disparity difference corresponding to a distance of stretching of said first frame and said second frame;

selecting a distance corresponding to a lowest disparity difference in said plurality of disparity differences as a stretching distance;

stretching the at least a portion of said first frame and said second frame such that a total stretching of said first and second frames approximately equals said stretching distance; and combining said common field of view of said first frame and said second frame subsequent to said step of stretching; and wherein the method steps are done by at least one processor.

* * * * *